US011530157B2

(12) United States Patent
DeMass et al.

(10) Patent No.: US 11,530,157 B2
(45) Date of Patent: Dec. 20, 2022

(54) METHOD OF MANUFACTURING AN OPTICAL FIBER USING AXIAL TENSION CONTROL TO REDUCE AXIAL VARIATIONS IN OPTICAL PROPERTIES

(71) Applicant: CORNING INCORPORATED, Corning, NY (US)

(72) Inventors: Sean Nicole DeMass, Beaumont, TX (US); Simit Mayank Patel, Greensboro, NC (US); Pushkar Tandon, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 128 days.

(21) Appl. No.: 16/871,575

(22) Filed: May 11, 2020

(65) Prior Publication Data

US 2020/0361809 A1    Nov. 19, 2020

Related U.S. Application Data

(60) Provisional application No. 62/849,358, filed on May 17, 2019.

(51) Int. Cl.
| | | |
|---|---|---|
| *C03B 37/025* | (2006.01) | |
| *C03B 37/027* | (2006.01) | |
| *G02B 6/036* | (2006.01) | |

(52) U.S. Cl.
CPC ........ *C03B 37/0253* (2013.01); *C03B 37/027* (2013.01); *G02B 6/0365* (2013.01); *G02B 6/03611* (2013.01)

(58) Field of Classification Search
CPC .............................................. C03B 37/02763
See application file for complete search history.

(56) References Cited

U.S. PATENT DOCUMENTS 5,073,179 A    12/1991    Yoshimura et al.
7,773,848 B2    8/2010    Bookbinder et al.
(Continued)

FOREIGN PATENT DOCUMENTS

| JP | 2289441 A | 11/1990 | |
|---|---|---|---|
| JP | 2013028508 A | * 2/2013 | ......... C03B 37/0253 |
| WO | 03/66537 A1 | 8/2003 | |

OTHER PUBLICATIONS

International Search Report and Written Opinion of the International Searching Authority; PCT/US2020/032286; dated Jul. 21, 2020; 13 Pages; European Patent Office.
(Continued)

*Primary Examiner* — Queenie S Dehghan
(74) *Attorney, Agent, or Firm* — Kevin L. Bray

(57) ABSTRACT

A method of manufacturing a tuned optical fiber includes providing a first preform from a set of like preforms each having substantially the same refractive index profile, including amount of axial variation relative to a target refractive index profile. The method includes drawing a reference optical fiber from the first preform and measuring a variation in an optical or physical property as a function of axial position. The method also includes drawing from a second preform from the set of like preforms the tuned optical fiber. The drawing includes using a time-varying tension that reduces the amount of variation of the optical or physical property of interest. The time-varying tension is defined by an amount of axial stress imparted to the tuned fiber needed to alter the refractive index profile and the at least one optical or physical property based on a stress-optic effect.

7 Claims, 14 Drawing Sheets

(56) References Cited

U.S. PATENT DOCUMENTS

| | | | |
|---|---|---|---|
| 8,322,166 B2 | 12/2012 | Bookbinder et al. | |
| 2002/0002845 A1* | 1/2002 | Fleury | C03B 37/0253 |
| | | | 65/382 |
| 2002/0005052 A1 | 1/2002 | Uhm | |
| 2002/0066292 A1 | 6/2002 | Wang | |
| 2005/0126227 A1 | 6/2005 | Collaro | |
| 2012/0125053 A1* | 5/2012 | Bookbinder | C03B 37/027 |
| | | | 65/378 |
| 2014/0318188 A1* | 10/2014 | Bowker | G01M 11/338 |
| | | | 65/378 |
| 2020/0379168 A1* | 12/2020 | Mukasa | C03B 37/01214 |

OTHER PUBLICATIONS

Lu et al.; "The Effect of Processing Parameters on Glass Fiber Birefringence Development and Relaxation"; J. Non-Newtonian Fluid Mech. 86 (1999) pp. 89-104.

Oh et al.; "Effect of Fiber Drawing Tension on Optical and Mechanical Properties of Optical Fiber Waveguides"; Journal of the American Ceramic Society, 1983; 2 Pages.

Ohashi et al.; "Optical Fiber Loss Reduction"; Electronics and Communications in Japan, Part 1, vol. 79, No. 12, 1996; pp. 724-735.

* cited by examiner

METHOD OF MANUFACTURING AN OPTICAL FIBER USING AXIAL TENSION CONTROL TO REDUCE AXIAL VARIATIONS IN OPTICAL PROPERTIES

This Application claims priority under 35 USC § 119(e) from U.S. Provisional Patent Application Ser. No. 62/849,358, filed on May 17, 2019, and which is incorporated by reference herein in its entirety.

FIELD

The present disclosure generally relates to methods of manufacturing an optical fiber using a fiber drawing system, and more particularly relates to methods of manufacturing the optical fiber in a manner that reduces axial variations in the optical properties of the optical fiber by axially controlling the draw tension.

BACKGROUND

Conventional manufacturing processes for producing optical fibers typically include drawing optical fiber from a heated glass preform in a draw furnace, cooling the drawn optical fiber, and coating the optical fiber after it has sufficiently cooled. Ideally, the drawn optical fiber has select optical properties as defined by the preform and the parameters of the various process steps carried out by the drawing system, with the select optical properties of the optical fiber being axially uniform, i.e., the same for any cross-section of the optical fiber taken at any position along the length of the optical fiber.

In the manufacturing of single mode bend-insensitive optical fiber, axial trends in the optical properties can be induced due to variations in one or more of the process steps. One such process step is the formation of the preform used to draw the optical fiber. One method of forming a preform involves a deposition step, wherein soot from different burners in a deposition sub-system comprising many burners is deposited on a target rod. The pertinent parameter for this process step is the soot deposition rate and deposition uniformity. A variation in the soot deposition rate can result in an axial variation in the soot overclad thickness. This in turn can result in an axial variation in the refractive index profile of the optical fiber drawn using the preform. Such axial variations can exceed design tolerances and thus adversely impact the manufacturing yield.

There are also other process steps and process parameters involved in forming the optical fiber, each of which can contribute to different extents to the overall axial variation in the optical properties of the drawn fiber. Unfortunately, it may not be cost-effective or even possible to try to reduce the source of variation of those process steps that contribute the most to the axial variation in the optical properties of the fiber. For example, as noted above, the soot deposition process used to form the preform involves depositing soot from multiple burners. While steps are taken to reduce non-uniformities in the soot deposition (e.g., by moving the burning during the soot laydown or systematically varying the flow rate of deposition precursors to different burners), this deposition process has inherent variations that cannot be entirely eliminated by cost-effective means. Yet, reducing the axial variation in the optical properties of a drawn optical fiber is desirable because such reduction leads to improved manufacturing yield and lower manufacturing costs.

SUMMARY

An embodiment of the disclosure is a method of manufacturing a tuned optical fiber, comprising: providing in a furnace a first preform from a set of preforms each having a variation in an optical property as a function of axial position relative to a target value of the optical property; drawing a reference optical fiber from the first preform using a constant draw tension; determining a variation in the optical property of the reference optical fiber as a function of axial position relative to the target value of the optical property; drawing from a second preform from the set of preforms a tuned optical fiber, the drawing from the second preform including using a time-varying draw tension, the time-varying draw tension reducing the variation in the optical property as a function of axial position relative to the target value of the optical property in the tuned optical fiber relative to the reference optical fiber.

An embodiment of the disclosure is a method of manufacturing a tuned optical fiber, comprising: providing in a furnace a first preform from a set of preforms each having a variation in a physical property as a function of axial position relative to a target value of the physical property; drawing a reference optical fiber from the first preform using a constant draw tension; determining a variation in the physical property of the reference optical fiber as a function of axial position relative to the target value of the physical property; drawing from a second preform from the set of preforms a tuned optical fiber, the drawing from the second preform including using a time-varying draw tension, the time-varying draw tension reducing the variation in the physical property as a function of axial position relative to the target value of the physical property in the tuned optical fiber relative to the reference optical fiber.

Another embodiment of the disclosure is a method of manufacturing a tuned optical fiber, comprising: measuring an optical property of a glass preform in an axial direction; determining a variation in the optical property of the glass preform in the axial direction relative to a target value of the optical property of the glass preform in the axial direction; specifying a fixed draw tension; determining an expected variation in the optical property in the axial direction for an optical fiber of a specified length drawn from the glass preform from the variation in the optical property of the glass preform in the axial direction and the fixed draw tension; determining a time-varying draw tension from the expected variation; and drawing a tuned optical fiber from the glass preform, the drawing comprising imparting the time-varying draw tension to the glass preform, the tuned optical fiber having a variation in the optical property in the axial direction over the specified length less than the expected variation.

Another embodiment of the disclosure is a method of manufacturing a tuned optical fiber, comprising: measuring a physical property of a glass preform in an axial direction; determining a variation in the physical property of the glass preform in the axial direction relative to a target value of the physical property of the glass preform in the axial direction; specifying a fixed draw tension; determining an expected variation in the physical property in the axial direction for an optical fiber of a specified length drawn from the glass preform from the variation in the physical property of the glass preform in the axial direction and the fixed draw tension; determining a time-varying draw tension from the expected variation; and drawing a tuned optical fiber from the glass preform, the drawing comprising imparting the time-varying draw tension to the glass preform, the tuned optical fiber having a variation in the physical property in the axial direction over the specified length less than the expected variation.

Another embodiment of the disclosure is a method of manufacturing a tuned optical fiber having a cable cut-off wavelength $\lambda_C$ and a length, comprising: drawing a reference optical fiber from a first preform of a set of preforms using a constant draw tension; measuring a variation in the cable cut-off wavelength $\lambda_C$ of the reference optical fiber as a function of axial position; and drawing a tuned optical fiber from a second preform of the set preforms, the drawing from the second preform including using a time-varying draw tension, the time-varying draw tension reducing the variation in the cable cut-off wavelength $\lambda_C$ as a function of axial position in the tuned optical fiber relative to the reference optical fiber.

In some embodiments of the method, the cable cutoff wavelength $\lambda_C$ is less than 1260 nm for greater than 85% over the length of the tuned optical fiber, wherein in various examples, the length is at least 1 km or at least 5 km or at least 20 km or at least 50 km or at least 100 km or at least 500 km or at least 1000 km. The method can also be applied to shorter fiber lengths, and the fiber length to which the methods apply are dictated in one example by the length scale of the variation in the given optical parameter of interest.

Additional features and advantages will be set forth in the detailed description which follows, and in part will be apparent to those skilled in the art from that description or recognized by practicing the embodiments as described herein, including the detailed description which follows, the claims, as well as the appended drawings.

It is to be understood that both the foregoing general description and the following detailed description are merely exemplary and are intended to provide an overview or framework to understanding the nature and character of the claims. The accompanying drawings are included to provide a further understanding and are incorporated in and constitute a part of this specification. The drawings illustrate one or more embodiments, and together with the description explain the principles and operation of the various embodiments.

DETAILED DESCRIPTION

Figure 1A:
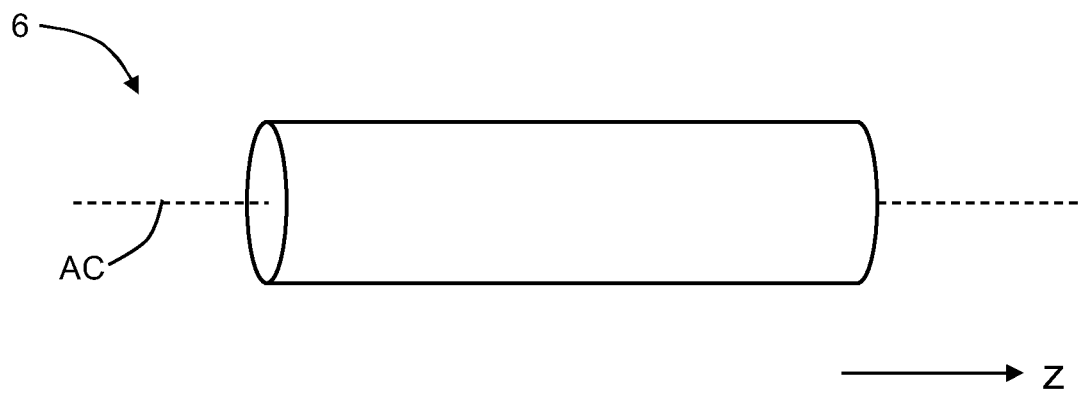
FIG. 1A is a schematic elevated view of an example optical fiber.

Reference is made in detail to example embodiments illustrated in the accompanying drawings. Whenever possible, the same reference numerals are used throughout the drawings to refer to the same or like parts.

The claims as set forth below are incorporated into and constitute part of this Detailed Description.

Cartesian coordinates are used in some of the Figures for the sake of reference and ease of illustration and are not intended to be limiting as to direction or orientation. The z-direction is taken as the axial direction of the optical fiber.

The term "fiber" as used herein is shorthand for optical fiber.

The acronym "CTE" stands for coefficient of thermal expansion.

The coordinate r is a radial coordinate, where r=0 corresponds to the centerline of the fiber.

The symbol "μm" is used as shorthand for "micron," which is a micrometer, i.e., $1 \times 10^{-6}$ meter.

The symbol "nm" is used as shorthand for "nanometer," which is $1 \times 10^{-9}$ meter.

The limits on any ranges cited herein are inclusive and thus lie within the range, unless otherwise specified.

The terms "comprising," and "comprises," e.g., "A comprises B," is intended to include as a special case the concept of "consisting," as in "A consists of B."

Some non-italicized parameters and variables are shown in italics in the equations set forth below by way of equation conventions used in the art.

The terms "draw tension" and "tension" are used interchangeably herein and are denoted by F and have units of grams, g. The variation in tension F in the axial direction is denoted F(z) and represents the value of the tension applied (or that was applied) to the drawn fiber at a given z location along the fiber as it is being drawn and for the length of fiber from the bottom of the preform to the take up spool (the "draw length" LD; see FIG. 2A). Since the fiber can only have one tension value at a time over the draw length LD, the tension F(z) does not represent a variation in the tension over the draw length but rather differences in axial tension F over relatively large axial sections of the optical fiber that are greater than the draw length, and in a typical example, much greater than the draw length.

The term "nominal fiber" means a fiber that has substantially no axial stress from the stress-optic effect so that the optical characteristics of the nominal fiber are defined by the fiber's glass composition alone.

The phrase "bare optical fiber" or "bare fiber" as used herein means an optical fiber directly drawn from a heated glass source (i.e., a "preform") and prior to applying a protective coating layer to its outer surface (e.g., prior to the bare optical fiber being coated with a polymeric-based material).

The "relative refractive index" as used herein is defined as:

$$\Delta\% = 100\frac{n^2(r) - n_{cl}^2}{2n^2(r)}$$

where n(r) is the refractive index of the fiber at the radial distance r from the fiber's centreline AC (r=0) at a wavelength of 1550 nm, unless otherwise specified, and $n_{cl}$ is the index of the outer cladding at a wavelength of 1550 nm. When the outer cladding is essentially pure silica, $n_{cl}$=1.444 at a wavelength of 1550 nm. As used herein, the relative refractive index percent (also referred herein as the "relative refractive index" for short) is represented by Δ (or "delta"), Δ% (or "delta %"), or %, all of which can be used interchangeably, and its values are given in units of percent or %, unless otherwise specified. Relative refractive index is also expressed as Δ(r) or Δ(r)%. Relative refractive index is also defined for specific regions "i" of a fiber, where the regions "i" include a core (i=1), inner cladding (i=2), trench (i=3), and/or outer cladding (i=4). The relative refractive index of region "i" is expressed as $\Delta_i$, where, unless otherwise specified, $\Delta_i$ refers to the average value of Δ in region "i". The minimum and maximum values of Δ in region "i" are expressed as $\Delta_{i,min}$ and $\Delta_{i,max}$, respectively.

In cases where the refractive index of a region is less than the reference index $n_{cl}$, the relative index percent is negative and is referred to as having a depressed region or depressed-index (also referred to as a "trench"), and the minimum relative refractive index is calculated at the point at which the relative index is most negative unless otherwise specified. In cases where the refractive index of a region is greater than the reference index $n_{cl}$, the relative index percent is positive and the region can be said to be raised or to have a positive index.

The term "dopant" as used herein refers to a substance that changes the relative refractive index of glass relative to pure undoped $SiO_2$. One or more other substances that are not dopants may be present in a region of an optical fiber (e.g., the core) having a positive relative refractive index Δ. The dopants used to form the core of the optical fiber disclosed herein include $GeO_2$ (germania) and $Al_2O_3$ (alumina). The parameter α (also called the "profile parameter" or "alpha parameter") as used herein relates to the relative refractive Δ(%) where r is the radius (radial coordinate), and which is defined by:

$$\Delta(r) = \Delta_0\{1-[(r-r_m)/(r_0-r_m)]_\alpha\}$$

where $r_m$ is the point where Δ(r) is the maximum $\Delta_0$, $r_0$ is the point at which Δ(r)=0 and r is in the range $r_{initial}$ to $r_{final}$, where Δ(r) is defined above, $r_{initial}$ is the initial point of the α-profile, $r_{final}$ is the final point of the α-profile and α is an exponent that is a real number. For a step index profile, α>10, and for a gradient-index profile, α<5. The parameter α is also used below for the CTE and one skilled in the art will understand when the parameter α stands for the CTE and when it stands for the alpha parameter that describes the refractive index profile.

The "trench volume" is denoted by V and is defined for a trench with a relative refractive index $\Delta_3$ as a constant $\Delta_{3,min}$:

$$V = \Delta_{3,min} \cdot [(r_3)^2 - (r_2)^2].$$

In an example where the relative refractive index $\Delta_3$ varies with radial coordinate (i.e., $\Delta_3(r)$), then the moat or trench volume is given by $$V = 2\int \Delta_3(r) r \, dr$$

with the limits on the integration being from $r_2$ to $r_3$ and the units in "%-μm²"

The "mode field diameter" or "MFD" of an optical fiber is determined using the Peterman II method, which is the current international standard measurement technique for measuring the MFD of an optical fiber. The MFD is given by:

$$MFD = 2w$$

$$w = \left[2\frac{\int_0^\infty (f(r))^2 r\, dr}{\int_0^\infty \left(\frac{df(r)}{dr}\right)^2 r\, dr}\right]^{1/2}$$

where f(r) is the transverse component of the electric field distribution of the guided optical signal and r is radial position in the fiber. The MFD depends on the wavelength of the optical signal and is reported herein for wavelengths of 850 nm, 980 nm, 1060 nm and 1550 nm.

The zero-dispersion wavelength is denoted $\lambda_0$ and is the wavelength where material dispersion and waveguide dispersion cancel each other. In silica-based optical fibers, the zero-dispersion wavelength is about 1300 nm, e.g., between 1300 and 1324 nm, depending on the dopants used to form the optical fiber.

The operating wavelength is denoted by λ and is a wavelength at which the optical fiber can operate while supporting a single mode.

The term "single mode" when referring to an optical fiber means that the optical fiber supports a single transverse electric (TE) mode and a single transverse magnetic (TM) mode at the operating wavelength.

The cut-off wavelength is denoted $\lambda_C$ and is the minimum wavelength at which the optical fiber will support only one propagating mode. For wavelengths below the cutoff wavelength $\lambda_C$, multimode transmission may occur and an additional source of dispersion may arise to limit the fiber's information carrying capacity. The cutoff wavelength $\lambda_C$ is reported herein as a fiber cutoff wavelength or a cable cutoff wavelength. The fiber cutoff wavelength is based on a 2-meter fiber length while the cable cutoff wavelength is based on a 22-meter cabled fiber length. The 22-meter cable cutoff wavelength is typically less than the 2-meter cutoff wavelength due to higher levels of bending and mechanical pressure in the cable environment. Thus, the operating wavelength λ has a lower limit of $\lambda_C$.

The axial stress is denoted $\sigma_z$ is measured in Megapascals (MPa) and is the amount of stress in the optical fiber as a function of position along the fiber center line, which in the discussion below is taken to be in the z-direction.

Figure 1B:
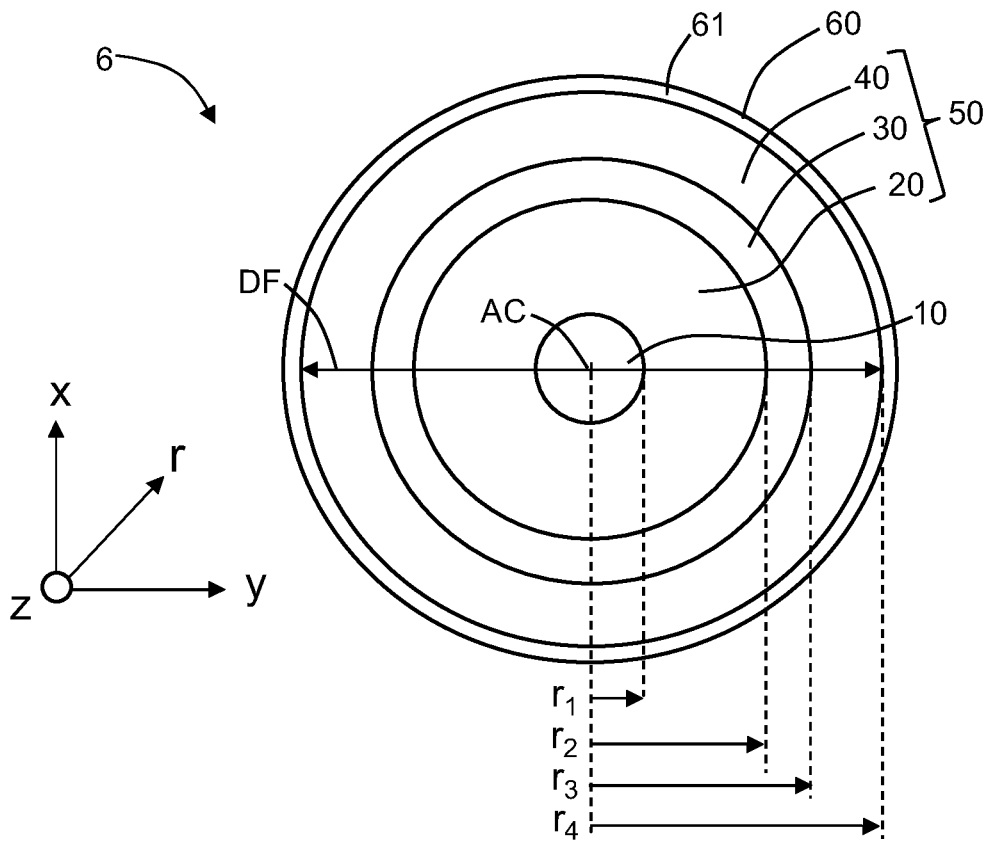
FIG. 1B is a schematic cross-sectional view of the example fiber of FIG. 1A.
Figure 2A:
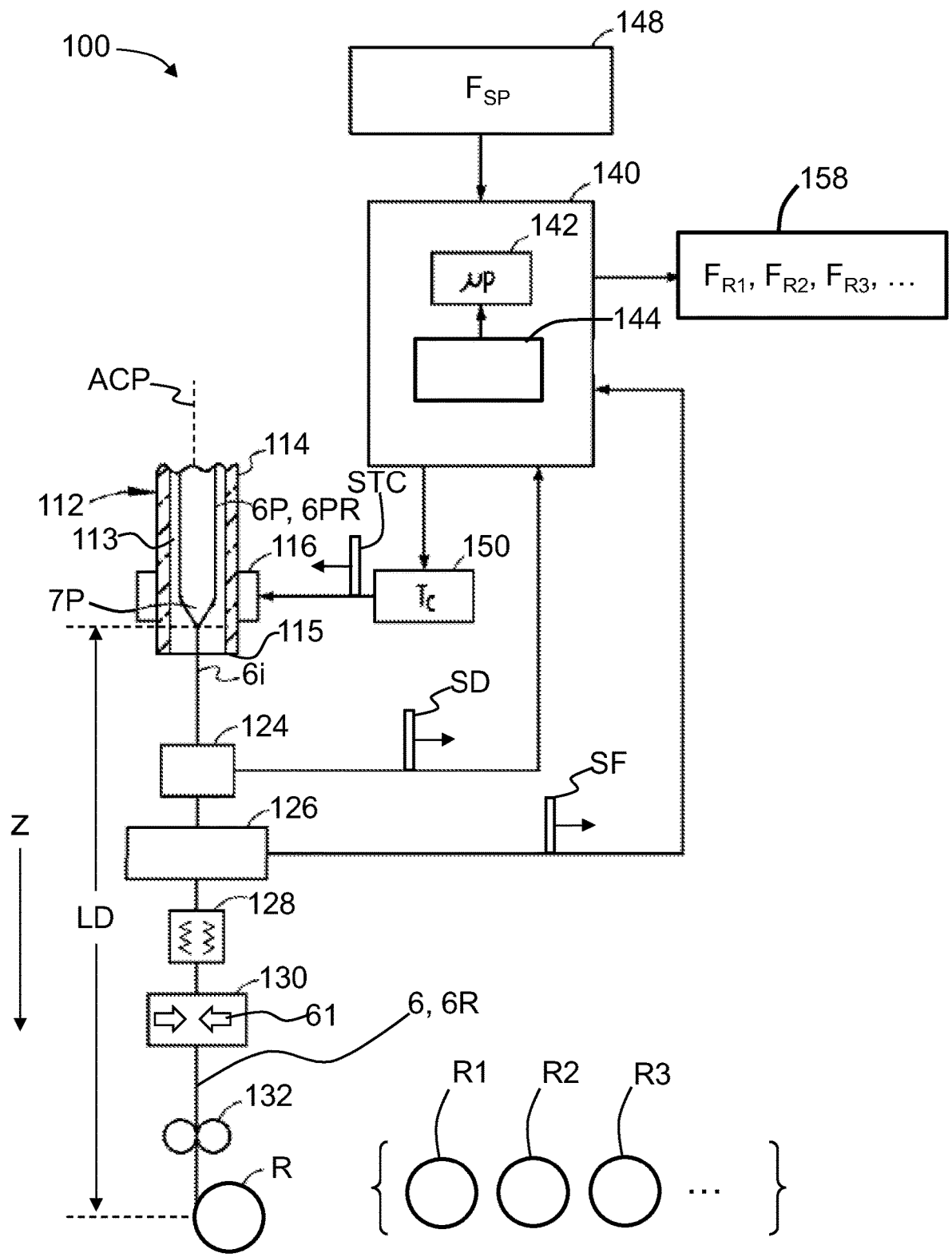
FIG. 2A is a schematic diagram of an example fiber drawing system as used herein to perform the methods of manufacturing (fabricating) the optical fiber as disclosed herein.

Axial direction for an optical fiber refers to the direction along the center line of the optical fiber. Axial direction for an optical fiber preform refers to the direction along the center line of the optical fiber preform. Axial position refers to position in the axial direction. For convenience in the discussion below, axial direction corresponds to the z-direction and axial position refers to position along the z-axis as shown in FIGS. 1B and 2A.

The bend loss is denoted by "$BL_{DM}$," where "DM" is the diameter in mm of the mandrel used to assess bending performance. The bend loss has units of dB/turn. The bending performance as discussed herein is macrobend performance and is gauged by measuring the induced attenuation increase in a mandrel wrap test. In the mandrel wrap test, the small diameter fiber is wrapped one or more times around a cylindrical mandrel of diameter DM (e.g., 10 mm, or 15 mm, etc.), and the increase in attenuation at a specified wavelength due to the bending is determined. Attenuation in the mandrel wrap test is expressed in units of dB/turn, where one turn refers to one revolution of the optical fiber about the mandrel. Bend loss values for mandrel diameters of 15 mm, 20 mm and 30 mm, i.e., for $BL_{15}$, $BL_{20}$ and $BL_{30}$, are provided below for example optical fibers formed using the methods disclosed herein as carried out on the fiber winding system of FIG. 2.

Optical attenuation is denoted by "A" and has units of dB/km.

Optical property refers to any of $\Delta$, $\Delta_i$, $\Delta_{i,min}$, or $\Delta_{i,max}$; refractive index n; α; radial position $r_i$ of any of sections "i"; radial positions $r_m$, $r_{initial}$, and $r_{final}$; cutoff wavelength $\lambda_C$; zero dispersion wavelength $\lambda_0$; mode field diameter (MFD); trench volume V; attenuation; bend loss $BL_{DM}$; glass composition; combinations thereof; and quantities derivable therefrom.

Physical property refers to soot uniformity, soot density, or physical dimension (e.g. diameter, radius, length).

Optical Fiber

Figure 1C:
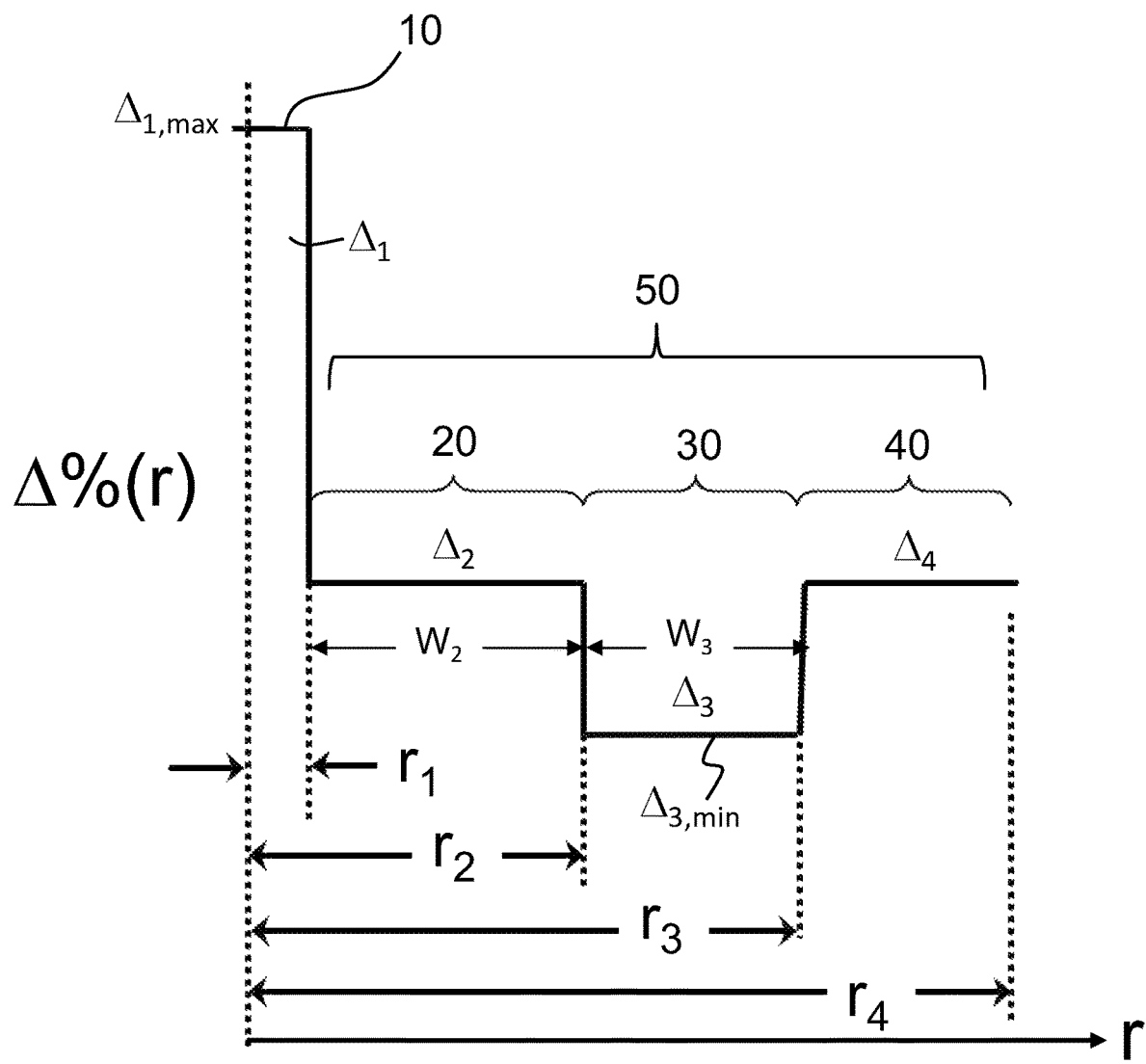
FIG. 1C is an example refractive index profile plot that plots the relative refractive index $\Delta\%(r)$ versus the radial coordinate r (unitless) for the optical fiber of FIGS. 1A and 1B.

FIG. 1A is a schematic elevated view of a section of an example optical fiber ("fiber") 6 formed using the methods disclosed herein. FIG. 1B is an x-y cross-sectional view of the fiber 6, while FIG. 1C is an example refractive index profile of the fiber in the form of a plot of the relative refractive index Δ%(r) versus the radial coordinate r. The fiber 6 is single mode and is configured to have a low bending loss.

The fiber 6 has a centerline AC shown by way of example as running in the z-direction. The fiber 6 comprises a glass core region ("core") 10 that is centered on the centerline AC and that has a radial extent $r_1$ and a relative refractive index $\Delta_1$, with a maximum value $\Delta_{1,max}$ on the centerline AC (i.e., at r=0).

The core 10 is immediately surrounded by a glass cladding region ("cladding") 50 that extends from the core radius $r_1$ out to a cladding outer radius $r_4$. The cladding 50 includes an inner cladding region ("inner cladding") 20 closest to the core and extending from the core radius $r_1$ to a radius $r_2$ and having a relative refractive index $\Delta_2<\Delta_1$; an intermediate cladding region or "trench" 30 immediately adjacent the inner cladding 20 and extending from the radius $r_2$ to a radius $r_3$ and having a relative refractive index $\Delta_3<\Delta_2$; and an outer cladding region ("outer cladding") 40 immediately adjacent the trench 30 and extending from the radius $r_3$ to the outer cladding radius $r_4$ and having a relative refractive index $\Delta_4$, wherein $\Delta_3<\Delta_4$.

In an example, the fiber 6 includes a protective coating 60 made of a non-glass material 61, such as a polymeric material. When the fiber 6 includes the protective coating 60, it is referred to as a coated fiber. Without the protective coating 60, the fiber 6 is referred to as a bare fiber. The fiber 6 when drawn using a time-varying tension using the methods disclosed herein is referred to as a tuned fiber.

Example Fiber Properties

Example desirable properties of the fiber 6 are set forth in U.S. Pat. No. 7,773,848, which is incorporated by reference herein. Some of these example properties are set forth below by way of non-limiting examples. Table 1 below also sets forth some example nominal and adjusted fiber parameters, properties and characteristics for fibers formed using the fiber tensioning systems and methods disclosed herein.

To achieve very low bend loses BL at relatively tight bend diameters (e.g., less than 30 mm), the trench 30 can comprise silica doped with fluorine and having a trench volume V, which in some examples is in the range $|V|>40\%$-μm², or $35\%$-μm²$\leq V \leq 70\%$-μm², or $40\%$-μm²$<|V|<60\%$-μm², or $45\%$-μm²$<|V|<55\Delta\%$-μm².

In some embodiments, $\Delta_{1,max}<0.45\%$, $\Delta_2>-0.05\%$, $\Delta_2<0.05\%$, $\Delta_{3,min}\leq-0.15\%$, $r_1\leq5.0$ μm, $r_1/r_2>0.45$ and $<0.60$, more preferably $>0.47$ and $<0.60$, and even more preferably $>0.47$ and $>0.55$.

In some embodiments, $0.47<r_1/r_2<0.55$. In some embodiments, $\Delta_{3,min}\leq-0.18\%$, and in some even more preferred embodiments, $\Delta_{3,min}\leq-0.2\%$.

In some embodiments, the width $W_2=r_2-r_1>2$ μm. In some embodiments, the trench width $W_3=r_3-r_2>1$ μm, and in other embodiments $1.0$ μm$<W_3<8.0$ μm, and in other embodiments $2.0$ μm$<W_3<8.0$ μm.

In some embodiments, $0.28\%<\Delta_1<0.45\%$, more preferably $0.30\%<\Delta_1<0.40\%$, and in some embodiments $0.31\%\leq\Delta_1\leq0.38\%$.

In some embodiments, $r_1<5.0$ μm, and in other embodiments $3.0$ μm$<r_1<5.0$ μm more preferably $3.5$ μm$<r_1<4.5$ μm.

In some embodiments, $r_2>6.0$ μm and $<11.0$ μm, more preferably, $r_2>7.0$ μm and $<9.0$ μm. In some embodiments, $r_3>10.0$ μm more preferably $>12.0$ μm or $r_3>21.0$ μm, or $<18.0$ μm. In some embodiments, $r_4>40.0$ μm. In some embodiments, $r_4>50.0$ μm. In other embodiments, $r_4>60.0$ μm. In some embodiments, $60.0$ μm$<r_4<70.0$ μm.

In some embodiments, the fiber 6 has mode field diameter MFD at 1310 nm of greater than 8.2 μm, more preferably greater than 8.8 μm; a mode field diameter MFD at 1550 nm of greater than 9.5 μm, more preferably greater than 9.8 μm; a zero dispersion wavelength $\lambda_0$ between 1300 and 1324 nm; and a cable cutoff wavelength $\lambda_C$ less than 1260 nm.

In an example, the fiber 6 has one or more optical properties as defined by the optical fiber industry standard ITU-G.657.A2, as published by the International Telecommunication Union and which is incorporated by reference herein.

Fiber Drawing System

FIG. 2A is a schematic diagram of a fiber drawing system ("system") 100 used to form the fiber 6 using the methods disclosed herein.

The system 100 includes a draw furnace ("furnace") 112 that includes a heating element 116 and a muffle 114. The furnace 112 has an interior 113 and an exit end 115. In an example, the furnace interior 113 is heated to a temperature of about 2,000° C. A glass preform 6P is disposed vertically in the muffle 114 of the draw furnace 112 and resides at least partially within the furnace interior 113. The glass preform 6P has a central axis ACP. The heating element 116 supplies heat to at least the bottom portion 6P of the preform 6P to the point where the preform can flow and be drawn. An initial bare fiber ("initial fiber") 6i is drawn from the heated preform 6P from the bottom portion 6P. The preform 6P can be moved downwardly to maintain a heated bottom portion 6P as the initial bare fiber 6i is drawn. The fiber draw process occurs over a draw length LD from the bottom portion 6P of the preform to a take up spool R, as described below.

Figure 2B:
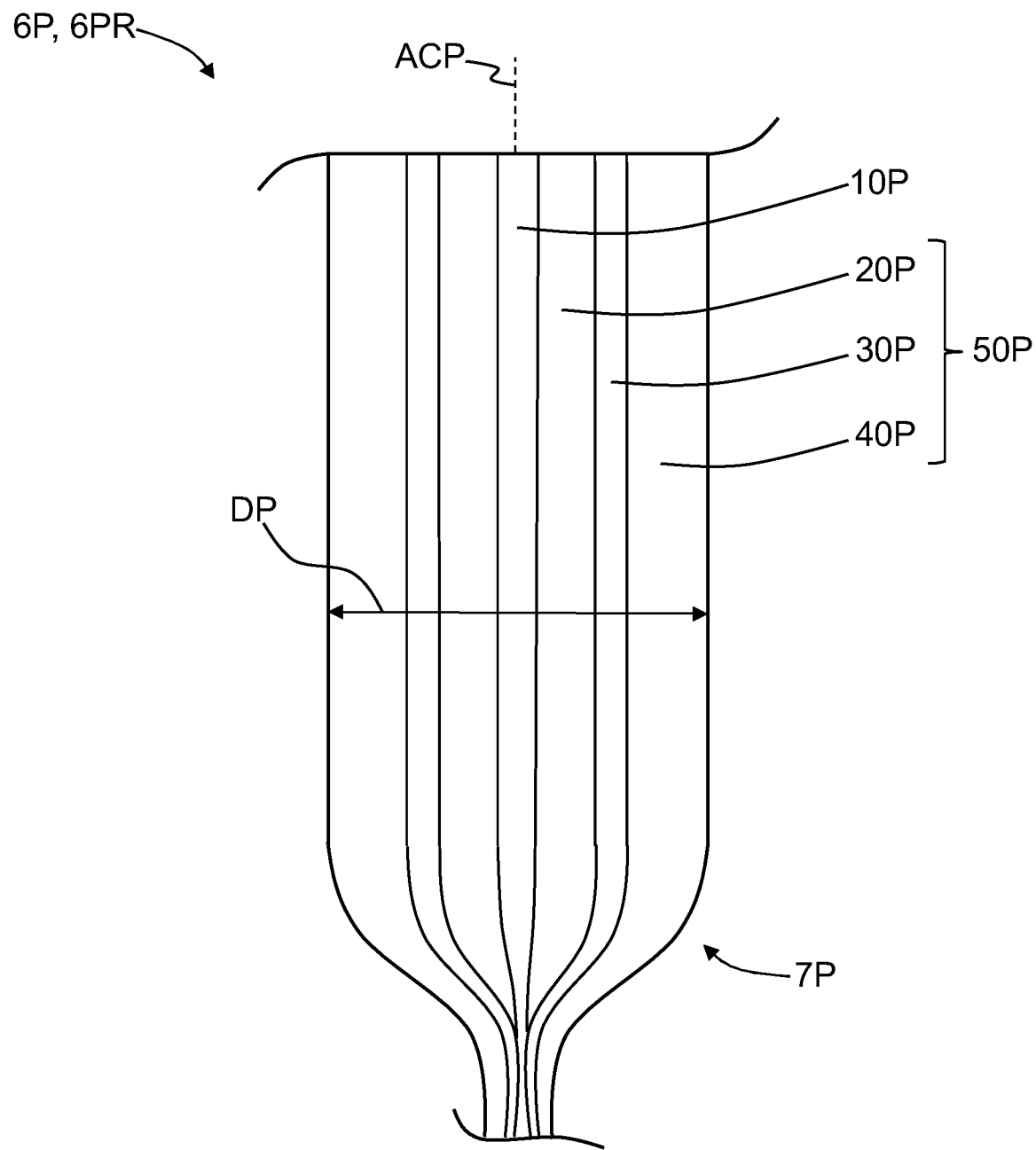
FIG. 2B is a close-up cross-sectional view of an end portion of an example glass preform used to form the optical fiber using the methods disclosed herein.

FIG. 2B is a close-up cross-sectional view of an end portion of an example preform 6P. The preform 6P may be constructed of any glass material and may be doped and otherwise processed suitable for the manufacture of the single mode fibers 6 disclosed herein. The preform 6P may be an entire core preform having a core 10P with cladding 50P made up of inner, intermediate and outer preform cladding regions 20P, 30P and 40P, respectively. The preform 6P may be any optical fiber preform produced from the original core preform, commonly referred to as canes having a cladding. The preform 6P has a preform diameter DP, which is much larger (e.g., 25× to 100× larger) than the fiber diameter DF. In an example, the preform 6P has a circular cross-sectional shape. The preform 6P has a refractive index profile $n_P(r)$, while the fiber has a refractive index profile $n(r)$. Since the preform refractive index profile $n_P(r)$ and thus the fiber refractive index profile $n(r)$ can also vary axially (i.e., in the z-direction), they are written as $n_P(r,z)$ and $n(r,z)$, respectively. More completely, in cylindrical coordinate, the preform and fiber refractive index profiles can be written as $n_P(r,\theta,z)$ and $n(r,\theta,z)$, respectively.

Figure 2C:
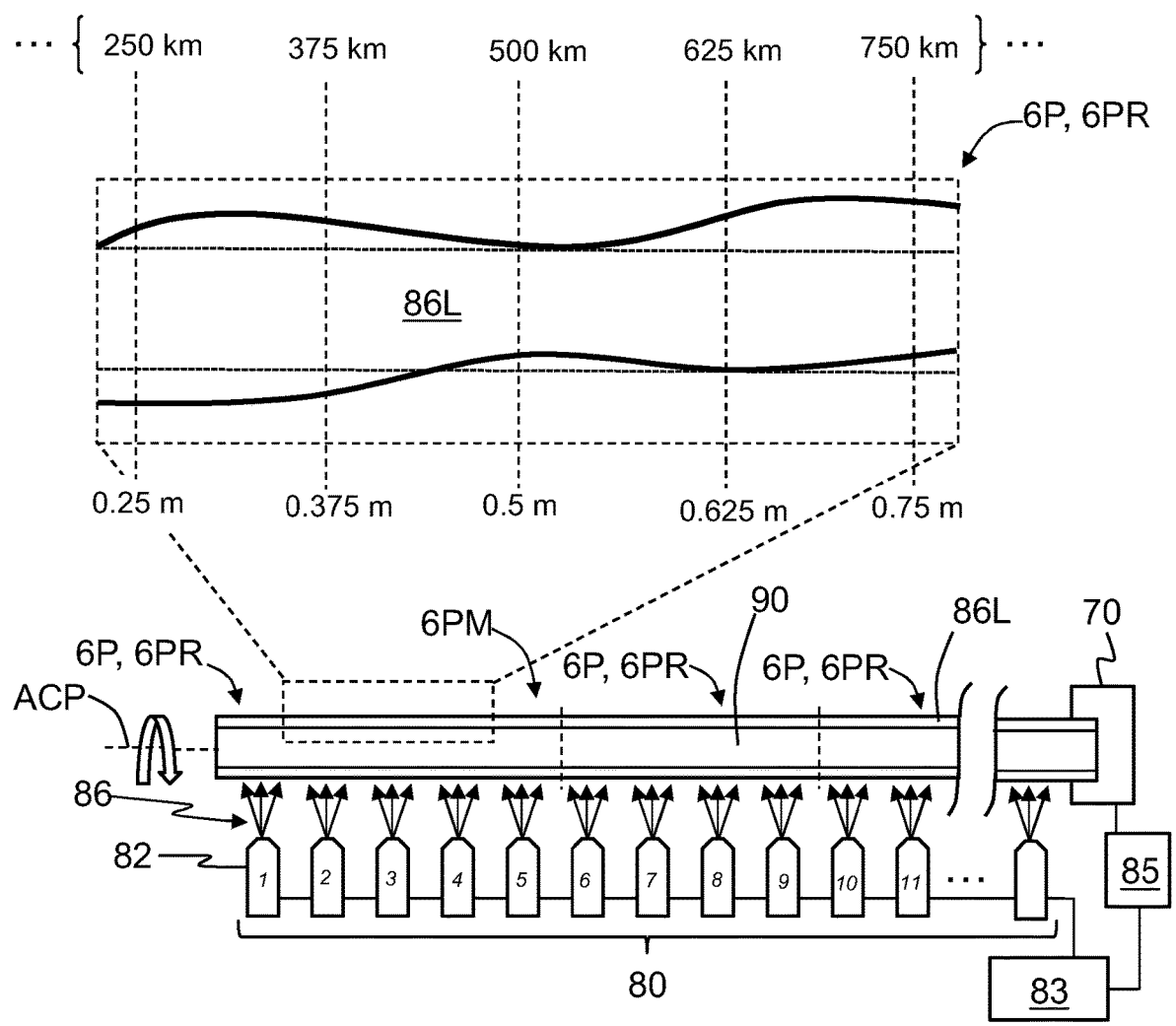
FIG. 2C is a schematic diagram illustrating the formation of the preform using a lathe and an array of burners that deposit soot to form the preform, wherein the close-up inset shows axial variations in the deposited soot layer that lead to axial variations in the refractive index profile of the final preform and thus in the drawn fiber, as indicated by the lower and upper length scales.

FIG. 2C is a schematic diagram illustrating the formation of multiple preforms 6P using a lathe 70 and an array 80 of burners 82 used to perform an outside vapor deposition (OVD) process. In the OVD process, raw chemical materials in the form of gases from a gas supply 83 are oxidized to form glass soot 86 that deposits on a target rod 90 as soot layers 86L. This process is referred to in the art as "laydown." A computer/controller 85 controls the mixture of gasses provided to the burners 82 to define the preform refractive index profile $n_P(r,z)$. The computer/controller 85 can also control the lathe rotation and lateral movement of the burners 82 relative to the (soot) preform 6P. In an example, the outermost of the soot layers 86L define an overclad layer.

After enough soot layers 86L are formed in the laydown process, the target rod 90 is removed and the remaining soot preform is dried and sintered as part of a process called "consolidation." This process collapses the soot preform into a solid glass rod, i.e., into a master preform 6PM having very low impurities. The master preform 6PM can be cut up into separate shorter preforms 6P. Example preforms 6P can have a length from 1 meter to 2 meters. In an example, the master preform 6PM is used directly as the preform 6P.

It should be appreciated that each preform 6P may have a different refractive index profile $n_P(r,z)$ and it is generally difficult to make an optimum/perfect/ideal refractive index profile for different master preforms 6PM due to variations in the processing of the preform and drawing of the preform as discussed above. On the other hand, two or more performs 6P, such as five preforms, may be formed from a single master preform 6PM. Preforms 6P formed from a single master preform 6PM typically have substantially the same draw characteristics. Likewise, preforms 6P formed on the same lathe 70, but from different master preform 6PM can also have substantially similar characteristics. In addition, different master preforms 6PM using the same controlled fabrication process can have substantially similar characteristics.

The close-up inset in FIG. 2C shows axial variations in the thickness of the deposited soot layers 86L from the burners 82 (i.e., burner numbers 2, 3 and 4) that lead to axial variations in the refractive index profile $n_P(r,z)$ of the final preform and thus in the refractive index profile $n(r,z)$ of the drawn fiber 6, keeping in mind that the fiber is essentially a drawn (thinned and stretched) version of the preform 6P. The lower and upper length scales provide, respectively, an approximate relationship of the axial position along preform 6P relative to the corresponding axial position along the fiber 6 drawn from preform 6P. The variation in soot layer thickness can occur even when the burners 82 are moved laterally back and forth during the laydown process.

The refractive index profile $n_P(r)$ (or equivalently, the relative refractive index profile $\Delta_P\%(r)$) for a given preform 6P or master preform 6PM can be measured using a refractive index measurement technique, such as a Preform Analyzer refractive index measurement system (Photon Kinetics Instruments, Beaverton, Oreg.). Alternatively, a given preform 6P and fiber 6 drawn therefrom can serve as a reference preform 6PR and a reference fiber 6R respectively, wherein axial refractive index profile variations in the reference fiber 6R can be measured and used as data for adjusting the tension F when drawing additional fibers from other like preforms 6P formed along with or in a like manner to the reference preform 6PR. In the discussion below, in a given set of like preforms 6P, at least one preform can be selected as the reference preform 6PR used to form a reference fiber 6R on which measurements are made, and the other preforms can be preforms used to form tuned fiber 6 for use in the field by drawing the preform using the adjustable tension methods disclosed herein. A fiber 6 drawn using the methods disclosed herein is referred to herein as a tuned fiber.

It is known in the art that a given axial position of the preform 6P corresponds to a given axial position of the drawn fiber for a given fiber draw process. It is also known in the art how to determine which given axial position of the preform 6P corresponds to which axial position of the fiber 6 drawn therefrom. Thus, as noted above, the close-up inset of FIG. 2C shows two axial length scales. The bottom axial length scale shows actual axial positions of the preform 6P. The top axial length scale shows example axial positions of the drawn fiber 6 that correspond (map) to the given axial position of the preform 6P. The example values shown assume that the preform 6P is 1 meter (m) long and is used to draw 1000 km of fiber 6.

Figure 2D:
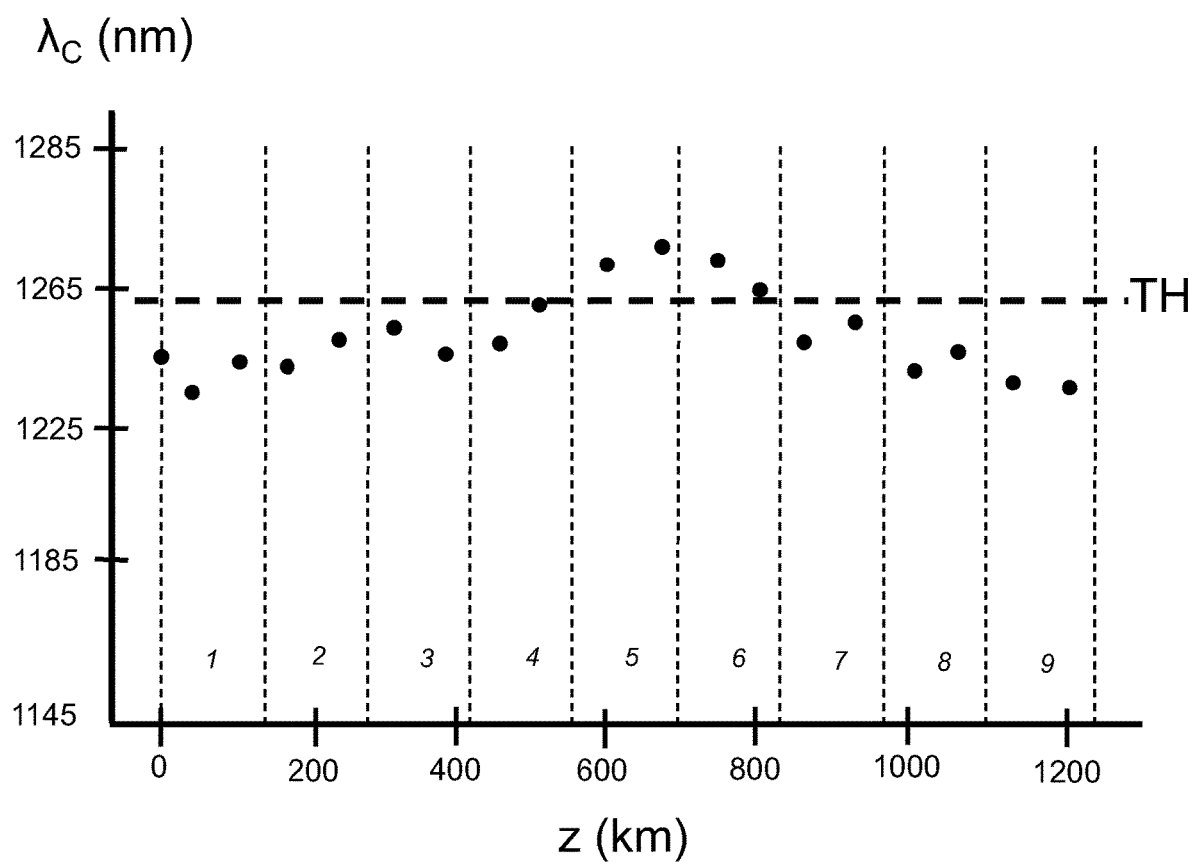
FIG. 2D is a plot of the cable cut-off wavelength $\lambda_C$ (nm) versus the distance z (km) as measured along an actual optical fiber, illustrating how the cable cut-off wavelength can vary along the length of the fiber and exceed the specification on the cable cut-off wavelength due to an axial variation in the fiber properties that originated in the preform.

FIG. 2D is a plot of the cable cut-off wavelength $\lambda_C$ (nm) versus the distance z (km) along the fiber 6. The preform 6P used for the fiber 6 considered in FIG. 2D was formed using nine burners 82, i.e., burner numbers 1 through 9, as indicated in the plot. The plot is schematic, but is based on actual measurements of the cable cut-off wavelength $\lambda_C$ made along the length of an actual drawn fibers 6 formed without varying the tension during the fiber draw process (i.e. a draw process using a draw tension that is constant in time). The threshold TH on the plot (dashed line) indicates the maximum allowable value of the cable cut-off wavelength $\lambda_C$ and represents an example cable cut-off specification. In FIG. 2C, shorter preforms 6P were formed form the master preform 6PM so that each preform has fewer burners 82 associated therewith.

With reference to FIG. 2D, the cable cut-off wavelength $\lambda_C$ exceeds a specification or threshold TH in the 600 km to 800 km span of the fiber 6, which corresponds to the burners numbered 5 and 6. Because the fiber 6 did not meet the cable cut-off specification over the entire length of the fiber, it was scrapped. The axial variation in the cable cut-off wavelength $\lambda_C$ was traced back to axial variations in the glass preform 6P used to draw the fiber 6. In other examples, more or fewer burners 82 can be correlated to the fiber length, depending on the process used to fabricate the master preform 6PM. For example, a relatively long lathe 70 having more or fewer than 19 burners 82 can be used, and 19 burners has been shown by way of example.

The cable cut-off $\lambda_C$ for a fiber 6 can be calculated for a given refractive index profile n(r). Thus, when general form (e.g., the desired) refractive index profile is known, the corresponding cable cut-off $\lambda_C$ is also known. If the measured cable cut-off $\lambda_C$ differs from the calculated value based on the desired or ideal refractive index profile, then the refractive index profile that gave rise to the different cable cut-off $\lambda_C$ can be determined. And as discussed in greater detail below, the draw tension F can be changed to adjust the refractive index profile n(r,z) back to or closer to its desired or ideal form because the refractive index profile changes with the amount of axial stress caused by a change in the draw tension F.

If the axial variations in the preform refractive index profile $n_P(r,z)$ are relatively slow (i.e. slight variation over a long distance in the axial direction), then a relatively long length of fiber 6 is drawn for a given amount of fiber tension F, and the fiber tension F can be changed relatively slowly during the draw process. Typical fiber draw speeds SF can be in the range from 5 m/s to 60 m/s, e.g., between 15 km/hr and 200 km/hr. If the preform refractive index profile $n_P(r,z)$ is such that the fiber refractive index profile n(r,z) changes substantially only over distances on the order of 50 km or greater, then at a fiber speed SF of 100 km/hr, tension changes can be made on time scales of about ½ hr. Faster tension changes can also be made, but this example is meant to show that the tension changes in many cases are not typically made on the order of seconds, but rather over minutes or over many minutes, or over fractions of an hour, so that adjusting the tension during the draw process is readily accomplished.

An example of the general method of adjusting/controlling the axial tension F during the draw process using system 100 includes: 1) forming a preform having core and cladding regions, such as by the OVD process described above and known in the art; 2) characterizing the preform refractive index profile $n_P(r,z)$ using known measurement or calculation techniques; 3) using the preform refractive index profile $n_P(r,z)$, calculating the fiber refractive index profile n(r,z) to determine axial variations in the fiber refractive index profile, or alternatively measuring a reference fiber drawn from a reference preform; 4) varying the fiber tension F during the draw in a manner that induces stress that in turn reduces the axial variations in the fiber refractive index profile n(r,z) due to the stress-optic effect.

Note that a variety of optical properties/parameters of the fiber 6 can be determined from the fiber refractive index profile n(r,z). Examples of such optical properties/parameters are listed in the left-most column in Table 1, below.

The variation in the fiber refractive index profile n(r,z) can be expressed as $$\Delta n(r,z) = |n(r,z) - n_D(r)| < Q,$$

where $n_D(r)$ is the designed or desired or target fiber refractive index (which varies only with the radial coordinate r) and where Q is a tolerance or specification on the amount of variation $\Delta n(r,z)$.

The tension F in the method is a function of the axial distance z along the fiber (F(z)) or equivalently becomes a function of time t (F(t)), where the fiber speed SF and the time t can be used to determine the distance z along the fiber, i.e., z=SF·t. As explained above, the tension F at any one time is constant and strictly speaking does not vary in the z-direction over the draw length LD during the fiber draw process (see FIG. 2A). Rather, the z-dependence on the tension F is used to indicate that the given z position along the fiber was formed using the given tension F.

The methods disclosed herein are carried out using the system 100. With reference again to FIG. 2A, example methods involve drawing the fiber 6 from the glass preform 6P at various draw tensions F while measuring the axial stress of the initial fiber 6i, and selecting the optimum draw tension for providing a reduced axial variation in one or more optical fiber properties, such as refractive index or the refractive index profile. The methods can serve as a quality control process that results in the formation of a fiber 6 that has less variation in one or more optical properties as compared to the same type of fiber formed using the same preform 6P and same drawing conditions, but without using the tension-based methods disclosed herein. Other methods include drawing a reference fiber 6R at a known tension (either fixed or varying in a known way) and then measuring one or more optical properties of the reference fiber. Use of multiple preforms 6P cut from a single master preform 6PM helps ensure repeatability of the fiber formation process since the same draw tension profile can be used. On the other hand, a reference fiber 6R drawn from a set of preforms having substantially the same properties can be used to define a draw tension profile that can be used for drawing fibers 6 with the other preforms in the set of preforms.

In forming the fiber 6, the initial bare fiber 6i is pulled from heated bottom (root portion) 7P of the preform 6P by a tractor 132. After leaving the furnace 112 at the exit end 115, the initial bare fiber 6i encounters a diameter monitor 124, which provides a diameter signal SD that is used in a feedback control loop to regulate speed of the tractor 132 to maintain a constant fiber diameter DF. The bare fiber 6i then passes through a fiber tension measurement device 126 that measures the tension of the initial bare fiber 6i and provides a feedback control loop (via a tension signal SF) to regulate the tension F of the initial bare fiber 6i to maintain a desired draw tension setting. An example of a fiber tension measurement device 126 is disclosed in EP 0479120 A2, which is hereby incorporated herein by reference.

Once the initial fiber 6i is drawn from the preform 6P, it is cooled in a cooling tube 128 or treatment device, which may be coupled to or remote from the exit end 113 of the furnace 112. The initial bare fiber 6i subsequently is coated by a coater 130, which may apply a polymeric-based coating material 61 to the outside surface of the initial bare fiber 6i to form the coating 60 to define the coated fiber 6 (see FIG. 1B). The coated fiber 6 may also pass through a coating curing apparatus (not shown). The coated fiber 6 is then wound onto a spool or reel R.

The fiber drawing system 100 also includes tension controller 140, which may be implemented as a computer having a microprocessor ("μp") 142 and a memory 144, according to one embodiment. It should be appreciated that any digital and/or analog processing circuitry and memory non-transitory storage (recording) medium may be employed. The tension controller 140 receives the diameter signal SD from the diameter monitoring device 124 and the tension signal SF from the fiber tension measurement device 126 and may process the inputs with one or more routines. In an example, the processor 142 of the tension controller 140 operates under the control of instructions (e.g., software or firmware) embodiment in the aforementioned non-transitory storage medium.

The tension controller 140 also provides an output 158, such as to a display or other human machine interface (HMI), for a user to view tension values F indicative of the tension used to form different fibers 6 wound on different reels R (R1, R2, R3, ...), e.g., $F_{R1}$, $F_{R2}$, $F_{R3}$, ..., etc., by performing different draw processes.

In an example, a user-selected tension setpoint $F_{SP}$ is provided as an input 148 to the tension controller 140 to allow a user to impart a select amount of stress $\sigma_z$ in the initial drawn fiber 6i.

The tension controller 140 generates a temperature control signal STC via an output 150 in response to the user selected tension setpoint $F_{SP}$ to set a controlled temperature $T_C$ in the furnace 112 via the controlled operation of the heating element 116. The controlled temperature $T_C$ is selected to achieve a desired fiber draw tension F(z) according to one embodiment.

Typically, an increase in the controlled temperature $T_C$ of the furnace 112 will cause a decrease in the tension F of the initial drawn fiber 6i, whereas a decrease in the controlled temperature $T_C$ of the furnace will cause an increase in the temperature of the drawn fiber. The controlled temperature $T_C$ of the furnace 112 may be adjusted with a feedback loop until the draw tension F reaches the user selected tension setpoint $F_{SP}$. According to another embodiment, the tension F of the initial drawn fiber 6i may be adjusted by adjusting the speed of the fiber drawn by the tractor 132, which may be controlled by the tension controller 140 responsive to the user selected tension setpoint $F_{SP}$. Thus, the draw tension F can be controlled and adjusted by the tension controller 140 by adjusting at least one of the tractor 132 and the controlled temperature $T_C$.

The drawing process induces in the fiber 6 a stress, which can affect one or more optical properties of the fiber through the stress optic effect. The stress includes a thermal component (thermal stress $\sigma_{z,th}$) and a mechanical component (mechanical stress $\sigma_{z,me}$) due to thermal and viscosity mismatches between the different regions (i.e., core and claddings) of the fiber 6.

A total stress $\sigma_z$ can be calculated by a superposition of the thermal and mechanical stresses $\sigma_{z,th}$ and $\sigma_{z,me}$, i.e., $$\sigma_z(r) = \sigma_{z,th}(r) + \sigma_{z,me}(r) \tag{1}$$

The mismatch in the CTEs between the different regions of the fiber gives rise to thermal stresses.

Considering the fiber 6 to be an elastic cylinder, the thermal stresses can be estimated as:

$$\sigma_{z,th}(r) = \int_{T_{room}}^{T_{set}} \frac{E(r,T)}{1 - \vartheta(r,T)} [\alpha((r,T)) - c(T)] dT \tag{2}$$

where $T_{set}$ is the setting temperature, $T_{room}$ is the room temperature, E(r,T) is the Young's modulus, $\alpha$(r,T) is the CTE and $\vartheta$(r,T) is the Poisson ratio. For a fiber of radius R, the parameter c(T) is calculated as:

$$c(T) = \frac{2}{R^2} \int_0^R \alpha(r,T) r dr \tag{3}$$

Note that the quantity $[\alpha(r,T) - c(T)]$ represents a variation in the CTE over the fiber, wherein the parameter c(T) is the average CTE of the fiber, with R denoting here the outermost fiber radius $R = r_4$ of the glass fiber.

Different dopants in different regions of the fiber 6 can also result in the different regions of the fiber having different viscosities. While the CTE $\alpha$ of silica and fluorine doped silica is not very different, their viscosities are very different, resulting in induction of mechanical stresses. The mechanical stress is estimated using the relationship:

$$\sigma_z(r) = F\left[\frac{\eta(r)}{\int_0^R 2\pi \eta(r) r dr} - \frac{E(r)}{\int_0^R 2\pi E(r) r dr}\right] \tag{4}$$

where F is the drawing tension and $\eta(r)$ is the viscosity at radial location r. The azimuthal ($\theta$) and radial (r) component of the stresses $\sigma_\theta$ and $\sigma_r$ calculated from $\sigma_z$ using the following relationship:

$$\sigma_r(r) = \frac{1}{r^2} \int_0^r \sigma_r(r) r dr \tag{5}$$

$$\sigma_r(r) + \sigma_\theta(r) = \sigma_z(r)$$

Because of the stresses that are induced in the fiber 6 during the drawing process, the atomic distance as well as the electron shells of the atoms that make up the different regions of the fiber 6 can be influenced. These cause a change $\Delta n$ in refractive index of the glass, which in cylindrical coordinates (r,$\theta$,z) is given as:

$$\Delta n_r = n_r - n = -B_2\sigma_r - B_1(\sigma_\theta + \sigma_z)$$

$$\Delta n_\theta = n_r - n = -B_2\sigma_\theta - B_1(\sigma_\theta + \sigma_r)$$

$$\Delta n_z = n_r - n = -B_2\sigma_z - B_1(\sigma_\theta + \sigma_r) \tag{6}$$

where n is the refractive index of unstressed glass, $\Delta n_r$, $\Delta n_\theta$ and $\Delta n_z$ are the refractive index changes in the radial, azimuthal and axial direction respectively, and, $B_1$ and $B_2$ are the stress-optical coefficients.

The equations (1) through (6) provide an explicit connection between the draw tension F and the fiber refractive index profile n(r,$\theta$,z) via the stress optic coefficients $B_1$ and $B_2$. Since the fiber refractive index profile n(r,$\theta$,z) defines or is defined by the optical properties of the drawn fiber, the above equations provide guidance for adjusting the draw tension F to adjust the fiber refractive index profile. As explained above, in one example, the draw tension F is adjusted either based on measurements of one or more optical properties of a reference optical fiber 6 or based on measurements of the preform refractive index profile $n_P(r,z)$.

Example Fibers

To illustrate the methods disclosed herein, consider an example single mode bend-insensitive fiber 6 having a core 10 doped with 6.7 wt % $GeO_2$ (corresponding to a relative refractive index of 0.378 $\Delta$%), an inner cladding 20 doped with 1200 ppm chlorine (corresponding to a relative refractive index of 0.1 $\Delta$%), a trench 30 doped with 0.77 wt % fluorine (corresponding to a relative refractive index of −0.206 Δ%) and an outer cladding 40 doped with 1200 ppm chlorine (corresponding to a relative refractive index of 0.1 Δ%). See Table 1 (entry for F=0 g) for other attributes of the example fiber 6 in the absence of tension.

Figure 3:
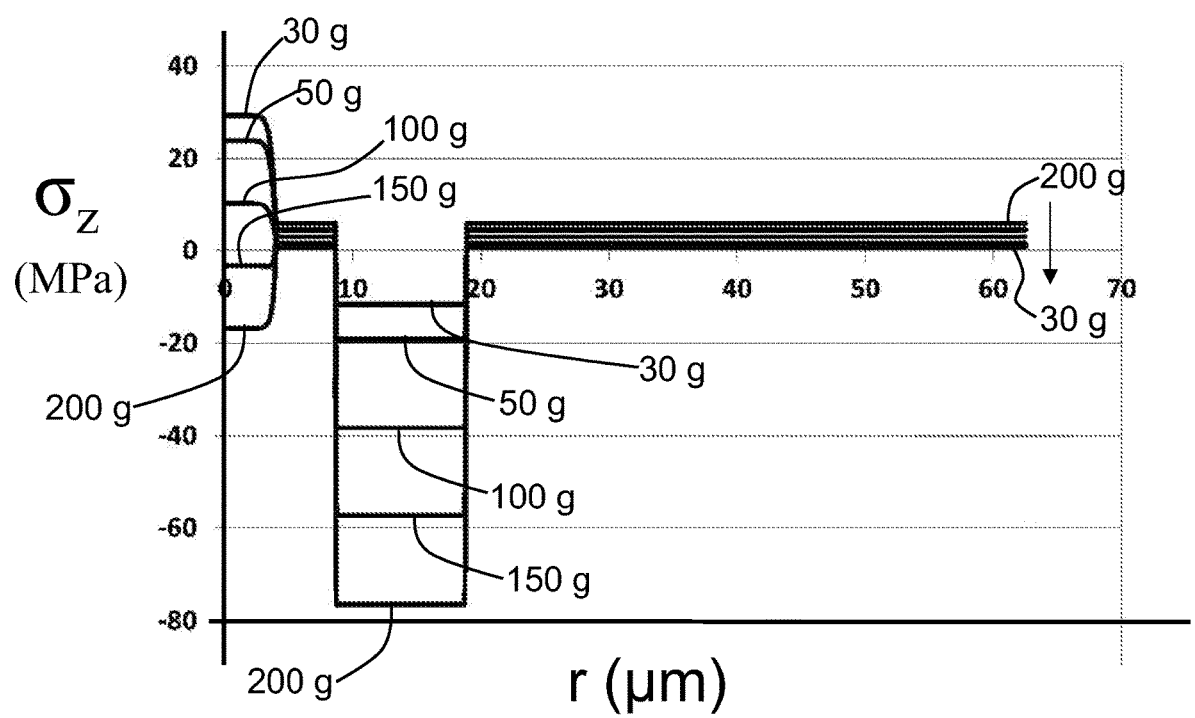
FIG. 3 is a plot of the calculated axial stress $\sigma_z$ as a function of fiber radius r (μm) as induced in an example optical fiber during a fiber draw process for draw tensions F of 30 g, 50 g, 100 g, 150 g and 200 g.

FIG. 3 plots the axial stress $\sigma_z$ as a function of fiber radial position r (μm) as calculated for the example fiber 6 described immediately above using Equations (1) through (6). The axial stress $\sigma_z$ is induced in the fiber 6 during the (simulated) draw process as a function of the draw tension F, which had example values of 0 g, 30 g, 50 g, 100 g, 150 g and 200 g as shown in FIG. 3.

Figure 4:
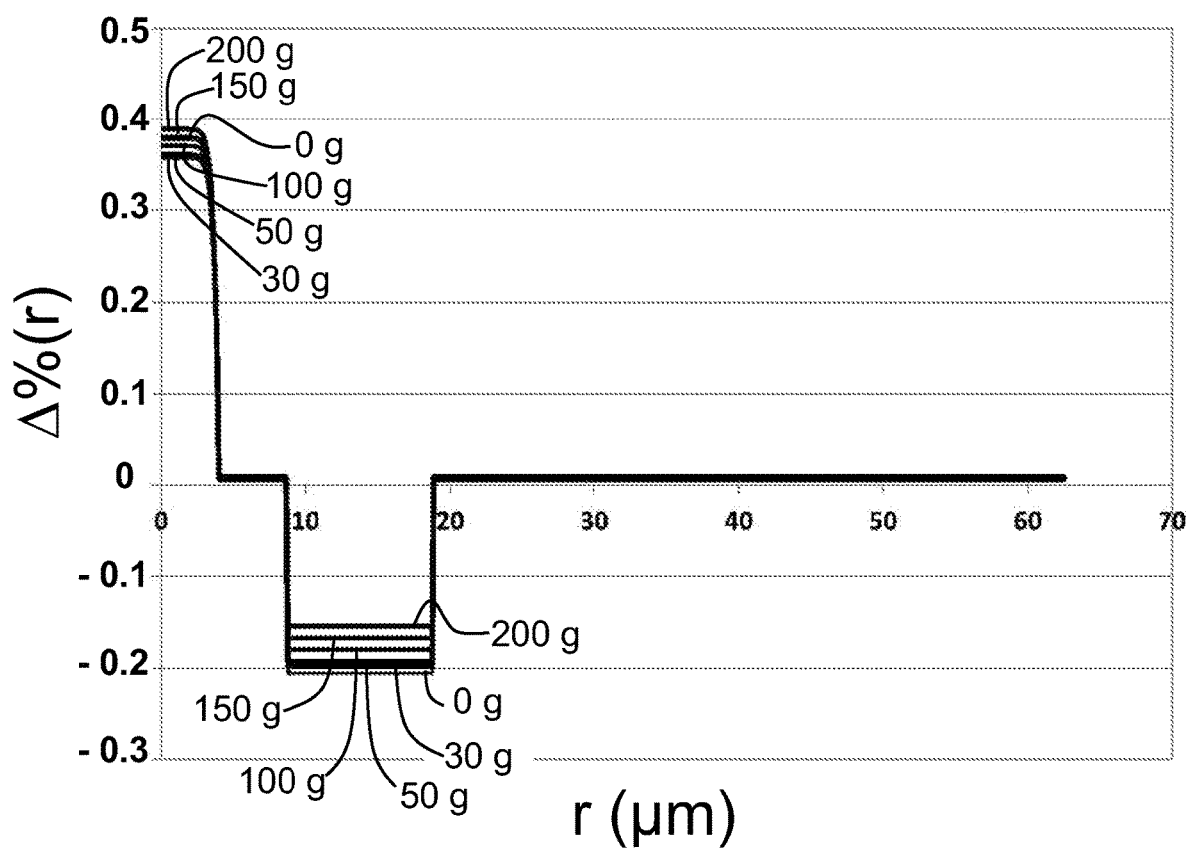
FIG. 4 plots the corresponding relative refractive index profile $\Delta\%(r)$ versus the fiber radius r (μm) for the fiber of FIG. 3 due to the stress-optic effect for the different draw tensions F of FIG. 3.

FIG. 4 plots the corresponding relative refractive index profile Δ%(r) versus the fiber radius r (μm) for the fiber 6 of FIG. 3 due to the stress-optic effect for the different draw tensions F of FIG. 3.

Table 1 below sets forth various calculated optical properties of the fibers 6 (as plotted in FIG. 3 and FIG. 4) for different draw tensions F to form a stress-optic modified fiber refractive index profile n(r).

TABLE 1

| Parameter | F = 0 g | F = 30 g | F = 50 g | F = 100 g | F = 150 g | F = 200 g |
|---|---|---|---|---|---|---|
| $\Delta_1$max (%) | 0.378 | 0.358 | 0.362 | 0.371 | 0.38 | 0.389 |
| $r_1$ (μm) | 4 | 4 | 4 | 4 | 4 | 4 |
| $\Delta_2$ (%) | 0.01 | 0.00948 | 0.00907 | 0.00804 | 0.00702 | 0.006 |
| $r_2$ (μm) | 8.625 | 8.625 | 8.625 | 8.625 | 8.625 | 8.625 |
| $\Delta_3$ (%) | −0.206 | −0.198 | −0.193 | −0.18 | −0.167 | −0.154 |
| $r_3$ (μm) | 18.75 | 18.75 | 18.75 | 18.75 | 18.75 | 18.75 |
| $\Delta_4$ (%) | 0.01 | 0.00948 | 0.00907 | 0.00804 | 0.00702 | 0.006 |
| $r_4$ (μm) | 62.5 | 62.5 | 62.5 | 62.5 | 62.5 | 62.5 |
| MFD @ 1310 nm (μm) | 8.46 | 8.61 | 8.58 | 8.51 | 8.43 | 8.36 |
| $\lambda_0$ (nm) | 1314 | 1302 | 1302 | 1303 | 1304 | 1304 |
| Trench Volume V (%Δ·μm²) | 59.75 | 57.45 | 55.92 | 52.08 | 48.24 | 44.4 |
| Cable Cutoff $\lambda_c$ (nm) | 1213 | 1175 | 1178 | 1184 | 1190 | 1190 |
| 15 mm diameter bend loss $BL_{15}$ (dB/turn) | 0.034 | 0.074 | 0.072 | 0.069 | 0.068 | 0.067 |
| 20 mm diameter bend loss $BL_{20}$ (dB/turn) | 0.008 | 0.017 | 0.017 | 0.016 | 0.015 | 0.014 |
| 30 mm diameter bend loss $BL_{30}$ (dB/turn) | 0.001 | 0.0026 | 0.0023 | 0.0017 | 0.0013 | 0.001 |

Since the refractive index profile n(r) (and relative refractive indices $\Delta_i$) can be altered through changing the draw tension F via the stress-optic effect, the methods disclosed herein include drawing the glass preform 6P in system 100 by adjusting the draw tension F as a function of time (or equivalently, as a function of axial position of the fiber) to tighten (or control) the distribution of one or more fiber optical properties and to compensate for axial variability due to axial deposition variability in the preform 6P (or the master preform 6PM) or in any other process parameters relating to forming the glass preform and drawing the fiber 6 from the glass preform using the system 100. In some embodiments, the draw tension F varies in the range between 30 grams and 300 grams. In other embodiments, the draw tension F varies in the range between 30 grams and 200 grams.

Figure 5:
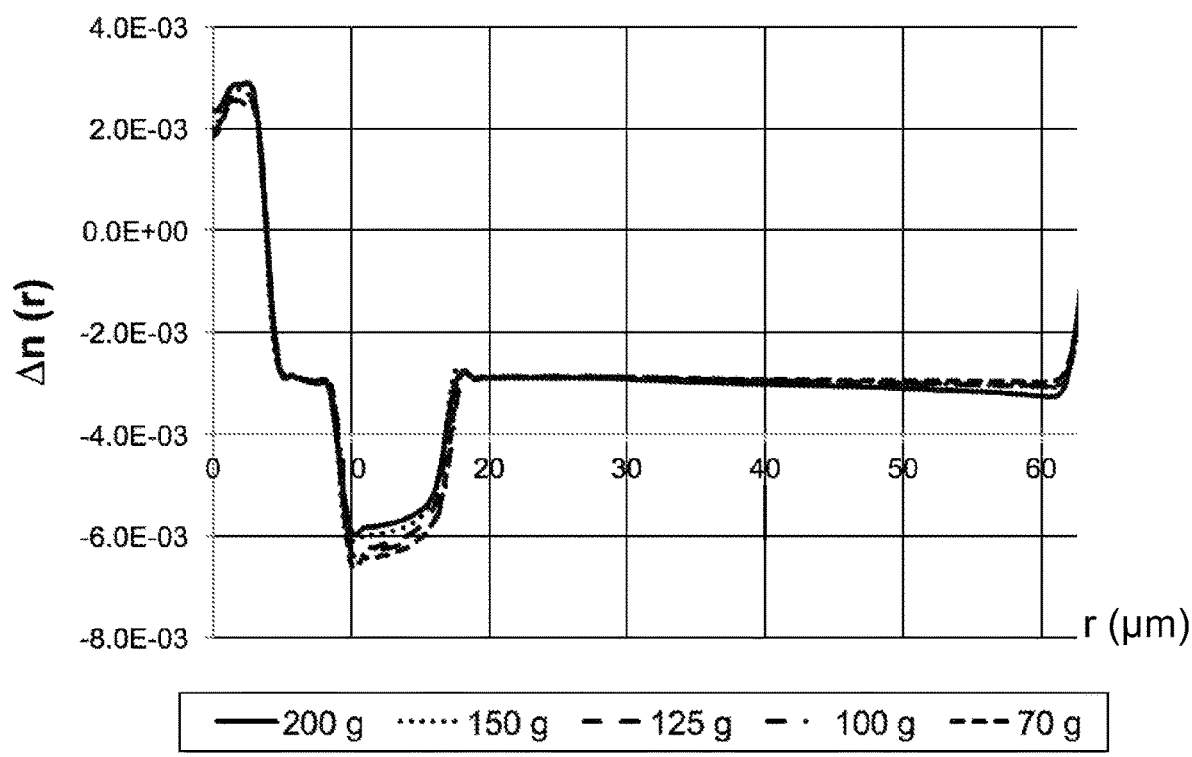
FIG. 5 plots the change in the normalized refractive index difference $\Delta n(r)$ versus the fiber radius r (μm) for measurement data from production made fibers using the methods disclosed herein.

FIG. 5 plots the change in the normalized refractive index difference Δn(r) versus the fiber radius r (μm) for measurement data from production made fibers using the methods disclosed herein.

Figure 6A:
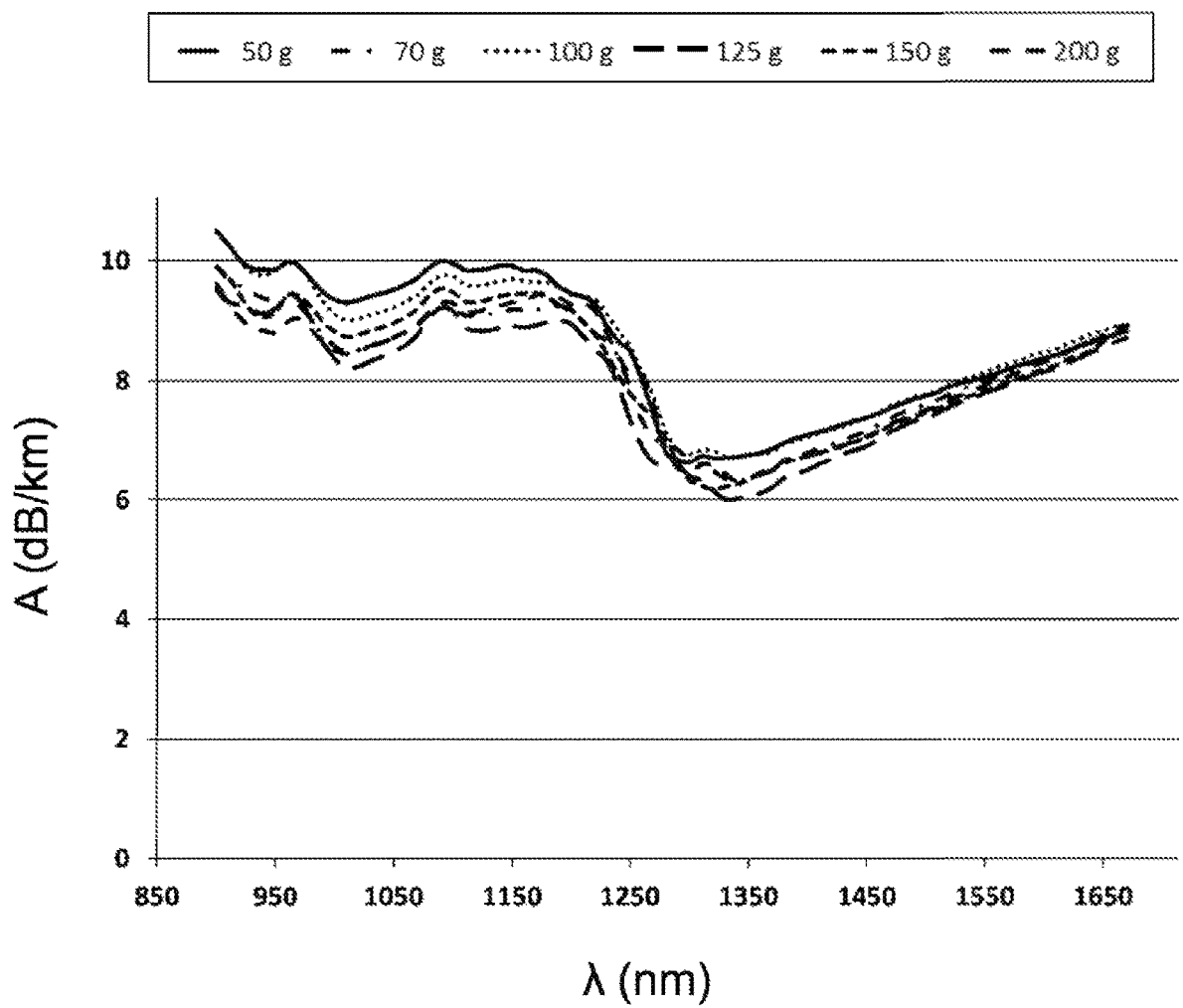
FIG. 6A is a plot of the attenuation A (dB/km) versus wavelength $\lambda$ (nm) showing the distribution of the cable cut-off wavelength $\lambda_C$ prior to adjusting the draw tension F.
Figure 6B:
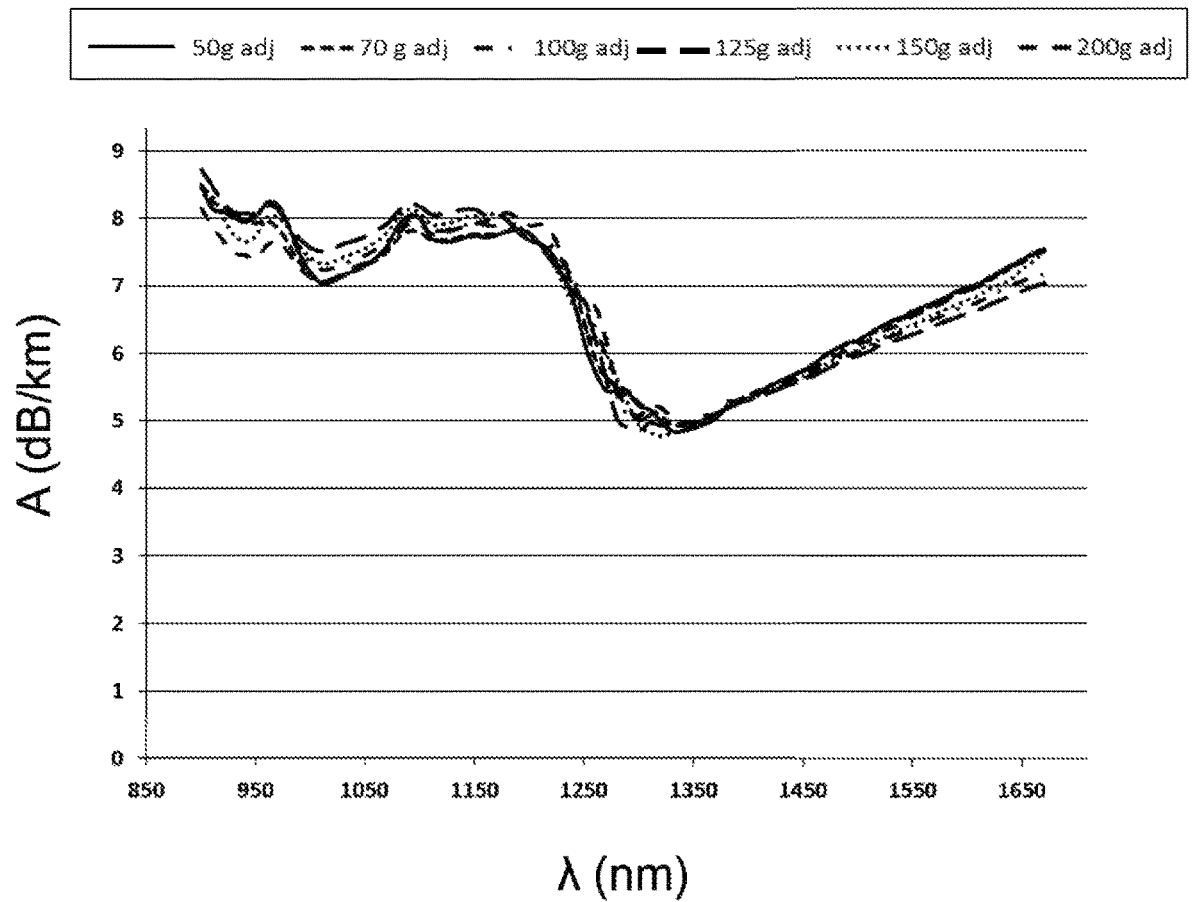
FIG. 6B is the same plot as FIG. 6A, but after adjusting the draw tension F by the indicated amount (e.g., "50 g adj"), and illustrates how adjusting the draw tension F can reduce the variation in the cable cut-off wavelength $\lambda_C$.

FIG. 6A is a plot of the attenuation A (dB/km) versus wavelength λ (nm) showing the distribution of the cut-off wavelength $\lambda_C$ prior to adjusting the draw tension F, while FIG. 6B is the same plot as FIG. 6A, but after adjusting the draw tension F. Results for trials using draw tensions ranging from 50 g to 200 g are shown. Unadjusted draw tension is referred to the "nominal" draw tension and the notation "adj" in FIG. 6B refers to the nominal draw tension with an adjustment in real time designed to minimize variability according to methods disclosed herein. A different adjustment was required for different values of nominal draw tension. The plots of FIGS. 6A and 6B show how the variation in the distribution in the cut-off wavelength $\lambda_C$ can be substantially reduced by active adjustment of the draw tension F(z).

Example Implementation of the Fiber Tensioning Method

An exemplary implementation of the fiber tensioning method is now provided. With reference to FIG. 2C, the axial variation in the thickness of an overclad layer(s) deposited along the length of the preform (e.g., as the soot layer 86L) results in axial variation in the radial scaling of the core ($r_1$), inner cladding ($r_2$) and the trench ($r_3$) positions at any given axial location, since the diameter of the drawn optical fiber 6 is constant (e.g., 125 microns) from all axial locations of the fiber preform 6P.

For the case of the entire optical fiber 6 drawn at a constant draw tension F, the axial variation in the radial scaling of the core, inner cladding and the trench position results in axial variation of optical properties of the fiber 6. For example, one optical property of the optical fiber is the cable cutoff wavelength $\lambda_C$ that may be calculated as Cable Cutoff $\lambda_C$ (nm)=Core LP11 Cutoff (nm)−150 nm+2.8·V where the Core LP11 Cutoff is the cutoff wavelength in nm of the LP11 mode for the core region, V is the trench volume ("%-μm²"), and 2.8V has units of nm.

The cable cutoff wavelength $\lambda_C$ of the fiber 6 drawn from a given axial location from the fiber preform 6P is impacted by the size of the core (i.e., core radius $r_1$) as well as the size of the inner cladding and trench (radii $r_2$ and $r_3$) at that axial location. Consequently, based on the methods outlined in Eqs. [1]-[6], a draw tension axial F(z) is defined as a function of axial position such that the axial change in tension F compensates for the axial variation in the thickness of the overclad layer 86L. This results in the fiber 6 having a significantly reduced variation in optical properties compared to optical fiber drawn at a single (constant) draw tension.

In one embodiment, the amount of axial variation in at least one optical property of the tuned optical fiber 6 is reduced by at least 30% compared to the amount of axial variation in the optical property of the optical fiber drawn at a single (constant) draw tension.

In another embodiment, the amount of axial variation in at least one optical property of the tuned optical fiber 6 is reduced by at least 50% compared to the amount of axial variation in the optical property of the optical fiber drawn at a single (constant) draw tension.

In another embodiment, the amount of axial variation in at least one optical property of the tuned fiber 6 is reduced by at least 70% compared to the amount of axial variation in the optical property of the optical fiber drawn at a single (constant) draw tension.

In an example, the amount of variation in the at least one optical property of the tuned fiber is an amount of variation in a cable cut-off wavelength $\lambda_C$.

In an example, the cable cut-off wavelength of the tuned optical fiber varies by no more than 10 nm from a mean value of the cable cut-off wavelength for a length of the tuned optical fiber of at least 5 kilometers.

In an example, the amount of variation in the cable cut-off wavelength in the corresponding constant-tension reference fiber exceeds the cable cut-off wavelength specification and the amount of variation in the cable cut-off wavelength is reduced so that the cable cut-off wavelength falls within a cable cut-off wavelength specification for at least 90% of the length of the tuned fiber.

In an embodiment, greater than 85% of the length of the tuned fiber 6 exhibits a cable cutoff wavelength $\lambda_C$ of less than 1260 nm. In another embodiment, greater than 95% of the length of the tuned fiber 6 exhibits a cable cutoff wavelength $\lambda_C$ of less than 1260 nm.

Figure 7A:
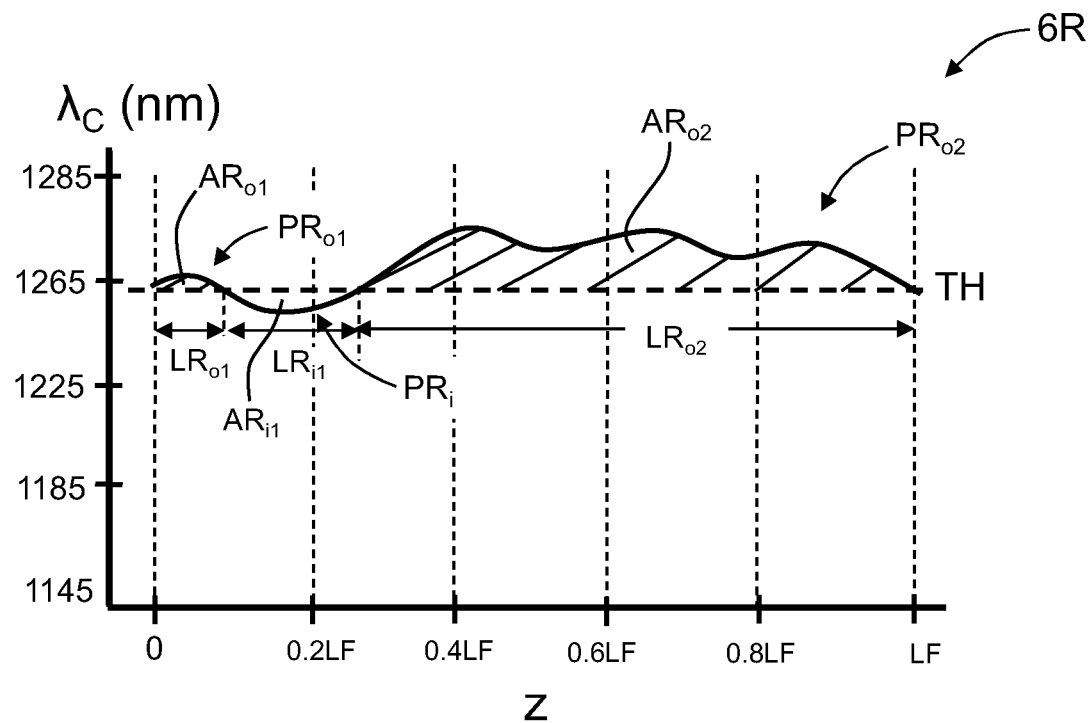
FIGS. 7A through 7C are schematic plots of the cable cut-off wavelength $\lambda_C$ (nm) versus the normalized distance z along the fiber length (i.e., z runs from 0 to the fiber length LF) for an example reference fiber (FIG. 7A) and example tuned fibers (FIGS. 7B and 7C), illustrating examples improvements in a given optical property of the fiber such as the cable cut-off wavelength $\lambda_C$ can be quantified.
Figure 7B:
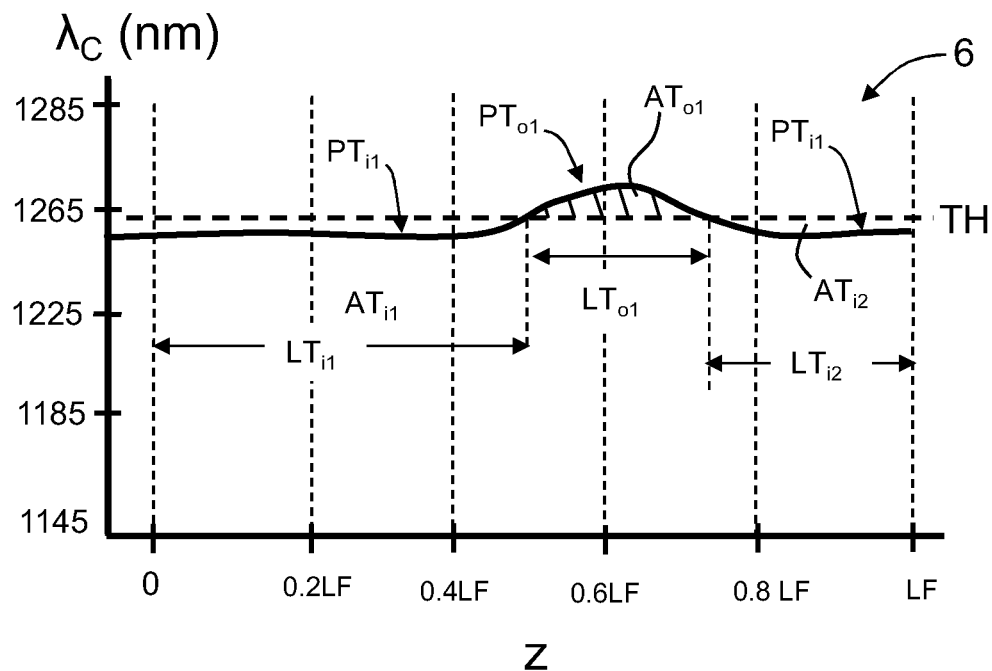

FIGS. 7A and 7B are similar to FIG. 2D and show schematic plots of the cable cut-off wavelength $\lambda_C$ versus the normalized distance z along a fiber of length LF for a reference (nominal) fiber 6R (FIG. 7A) and a tuned fiber 6 (FIG. 7B). The stress-optical coefficients $B_1$ and $B_2$ for the fiber of FIGS. 7A and 7B were $8.4 \times 10^{-6}$/MPa and $13 \times 10^{-7}$/MPa, respectively. As noted above, the axial variations in a given optical property typically occur over relatively long lengths LF of the reference and tuned fibers, e.g., at least 1 km or at least 5 km or at least 20 km or at least 50 km or at least 100 km or at least 500 km or at least 1000 km. Thus, in an example, the measurement of the given optical property is made over a length LF of the reference fiber 6R and tuned fiber 6 using one of the above length ranges. It is noted that the systems and methods disclosed herein can also be applied to shorter lengths LF, and the length LF to which the system and methods apply are dictated in one example by the length scale of the variation in the given optical parameter of interest.

FIGS. 7A and 7B show various example parameters that describe features of the plots that can be used to quantify the improvement in a given optical property of the fiber using the systems and methods disclosed herein.

The example reference fiber plot of FIG. 7A can have one or more portions $PR_o$, (e.g., two such portions, denoted $PR_{o1}$ and $PR_{o2}$) that reside above or "outside" the threshold value TH and one or more portions $PR_i$ (e.g., one such portion, denoted $PR_{i1}$) that reside below or "inside" the threshold value TH. The one or more portions $PR_o$ are the "out of spec" portions while the one or more portions $PR_i$ are the "in spec" portions.

The axial length of the first and second "out of spec" portions $PR_{o1}$ and $PR_{o2}$ are respectively denoted $LR_{o1}$ and $LR_{o2}$. The axial length of the "in spec" portion $PR_{i1}$ is denoted $LR_{i1}$. The areas of the first and second "out of spec" portions $PR_{o1}$ and $PR_{o2}$ as measured relative to the threshold TH are respectively denoted $AR_{o1}$ and $AR_{o2}$, while the area of the "in spec" portion $PR_{i1}$ is denoted $AR_{i1}$. Note that the example reference plot can have multiple "in spec" portions $PR_i$ as well, and only one is shown by way of example.

FIG. 7B is similar to FIG. 7A except it is for a tuned fiber 6, which has a reduced amount of variation in the cable cut-off wavelength $\lambda_C$. The example tuned fiber plot of FIG. 7B has one "out of spec" portion $PT_{o1}$ that resides above or "outside" the threshold value TH and two "in spec" portions $PT_{i1}$ and $PT_{i2}$ that reside below or "inside" the threshold value TH. The axial length of the single "out of spec" portion $PT_{o1}$ is denoted $LT_{o1}$. The axial length of the two "in spec" portions $PT_{i1}$ and $PT_{i2}$ are respectively denoted $LT_{i1}$ and $LT_{i2}$. The area of the "out of spec" portion $PT_{o1}$ as measured relative to the threshold TH is denoted $AT_{o1}$, while the areas of the two "in spec" portions $PT_{i1}$ and $PT_{i2}$ are denoted $AT_{i1}$ and $AT_{i2}$.

The above-described parameters can be used in different ways to quantify an amount of variation in the cable cut-off wavelength $\lambda_C$ and the relative reduction in the amount of variation between the reference fiber 6R and the tuned fiber 6. The above-described parameters can be used to characterize variations in the other optical properties in the same manner.

In one example, the amount of variation in the cable cut-off wavelength $\lambda_C$ in the reference fiber 6R is measured by the total length LTR of the "in spec" portions $PR_i$, of which in the example there is one such portion $PR_i$ of length $LR_{i1}$. This length can be expressed as a ratio $RLR = LR_{i1}/LF$, where LF is the total length of reference fiber 6 being considered. This ratio for the example reference fiber 6 is about $RLR = [0.2LF]/LF = 0.2$. The corresponding ratio for the tuned fiber 6 is $RLT = [LT_{i1} + LT_{i2}]/LF$, which for the example tuned fiber 6 is about $RLT = [4.5LF + 2.5FL]/LF = 0.7$. This means that about 70% of the tuned fiber falls within the specification as compared to only 20% of the reference fiber. This represents a 3.5× performance improvement or a 3.5× reduction the variation in the cable cut-off wavelength $\lambda_C$.

In another example, the respective areas $AR_i$ and $AT_i$ for the in-spec portions $PR_i$ and $PT_i$ are compared. The total "in spec" area $AR_1$ for the reference fiber is only about ⅒ of the total "in spec" area $[AT_{i1} + AT_{i2}]$ of the tuned fiber, which indicates a substantial improvement in the fabrication of the tuned fiber versus the reference fiber.

Other comparisons of the reference fiber 6R and the tuned fiber 6 can be made, such as by using the parameters for the "out-of-spec" portions $PR_o$ and $PT_o$, by calculating average optical parameter values and standard deviations to quantify a variance in the given optical parameter being considered, combining multiple measurement parameters, etc., using measurement and analysis techniques known in the art.

Figure 7C:
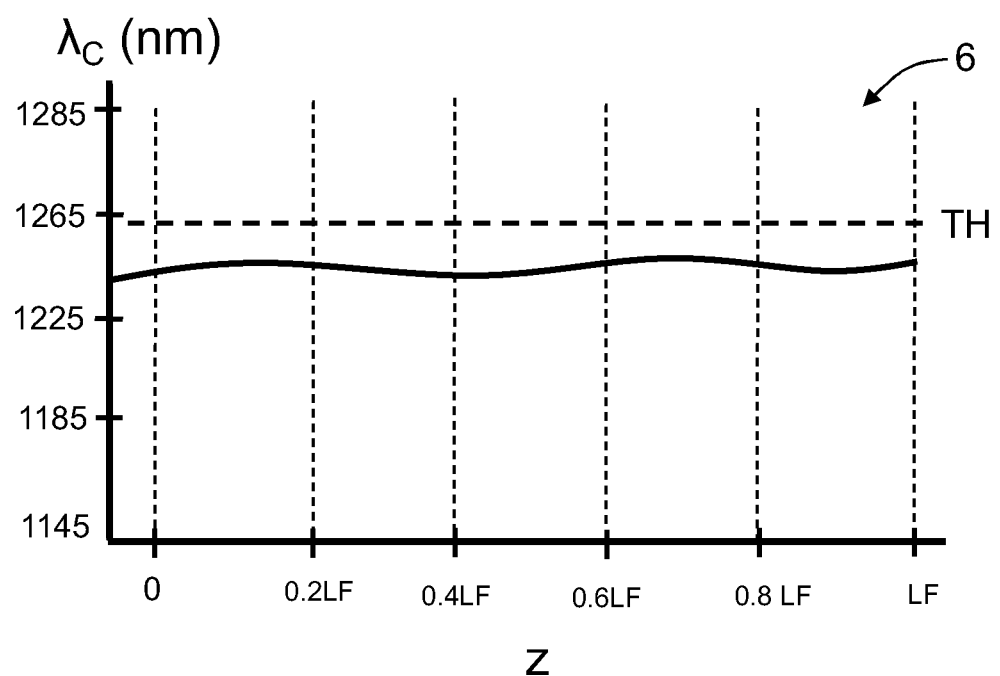

FIG. 7C is similar to FIG. 7B, except that now the cable cut-off wavelength $\lambda_C$ is below the threshold TH along the entire length LF of the tuned fiber 6. In this case, it is sufficient to know that the entirely of the tuned fiber 6 meets specification. This case also represents the example where the variation in the cable cut-off wavelength with distance z along the fiber length LF is even further reduced than in the example of FIG. 7B. The results associated with FIG. 7C can be obtained by reviewing the results of FIG. 7B and making additional adjustments to the tension in the problematic range from about 0.5 LF to about 0.7 LF for the next fiber draw process. Thus, an aspect of the disclosure includes using a tuned fiber 6 as a reference fiber to fabricate an improved tuned fiber 6.

An aspect of the methods disclosed herein includes varying the draw tension during the fiber drawing process to alter at least one optical property of a tuned fiber 6, and in particular to substantially reduce a variation in the optical property as a function of axial length along the tuned fiber 6. An example optical property is the cable cut-off wavelength $\lambda_C$ (nm).

Figure 8A:
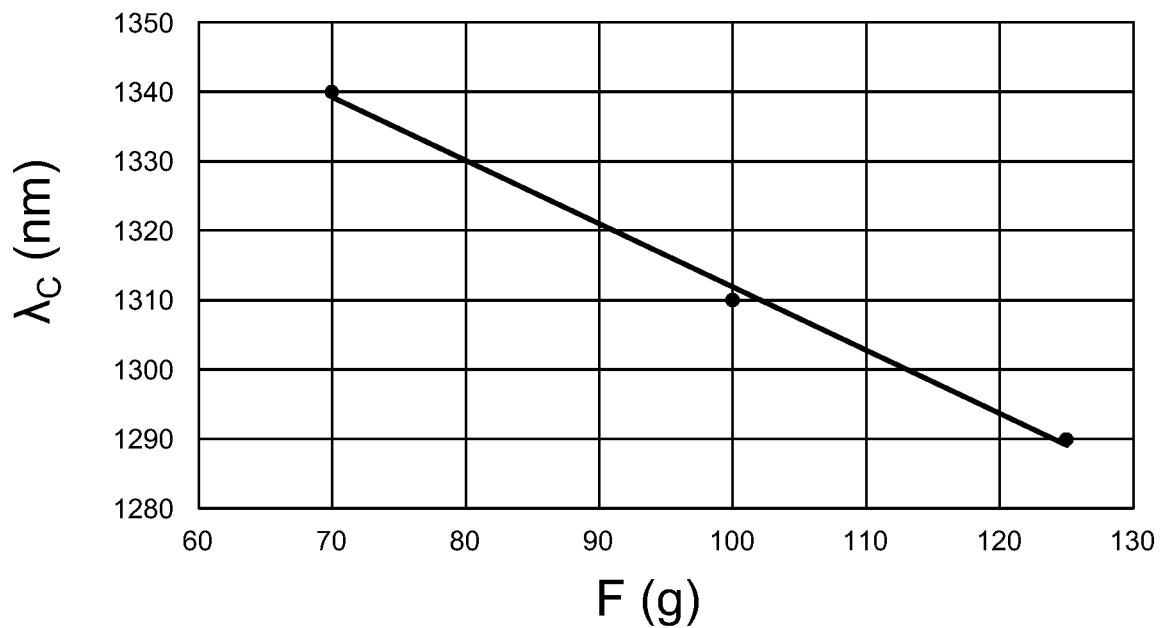
FIGS. 8A and 8B are plots of the cable cut-off wavelength $\lambda_C$ (nm) versus the draw tension F (g) and illustrate two different draw tension regimes for adjusting the cable cut-off wavelength.
Figure 8B:
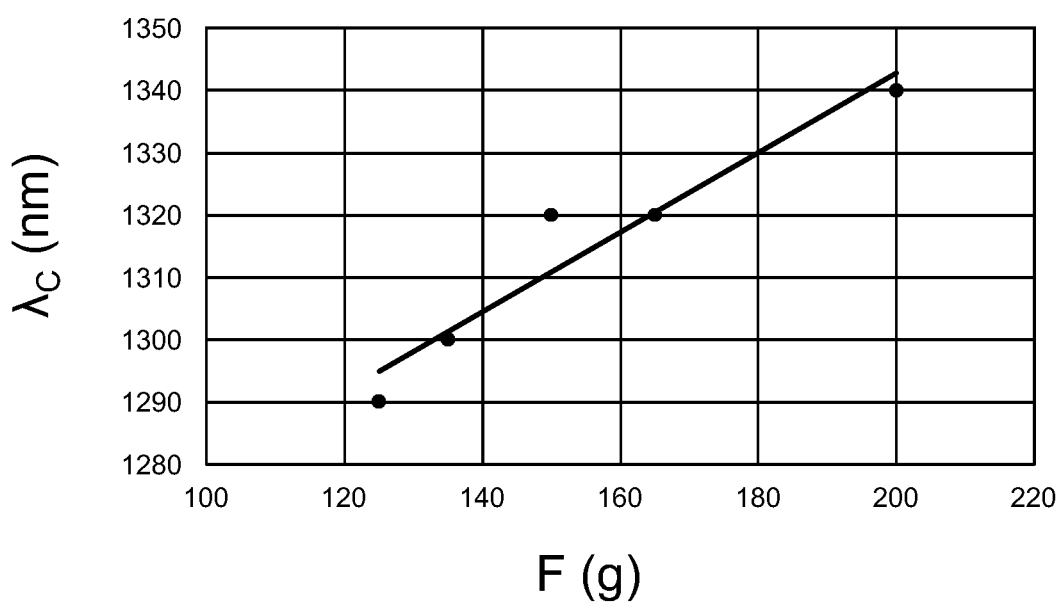

FIGS. 8A and 8B are plots of the cable cut-off wavelength $\lambda_C$ (nm) versus the draw tension F (g) for an optical fiber drawn from a preform. The optical fiber included a Ge-doped silica core (with a relative refractive index of about 0.4Δ% and radius of about 5 μm), an undoped silica inner cladding (thickness of about 2 μm), an F-doped silica trench (with a relative refractive index of about −0.2Δ% and a thickness of about 10 μm) and an undoped silica outer cladding (extending to the outer glass diameter of about 62.5 μm). Each plot includes a best-fit line to the measured data points. The plot of FIG. 8A illustrates an example where varying the draw tension F results in a decrease in the cable cut-off wavelength $\lambda_C$. In particular, the cable cut-off wavelength $\lambda_C$ was reduced from about 1340 nm at a draw tension F of 70 g to about 1290 nm at a draw tension F of 125 g. On the other hand, FIG. 8B illustrates an example where varying the draw tension F results in an increase in the cable cut-off wavelength $\lambda_C$. In particular, the cable cut-off wavelength $\lambda_C$ was increased from about 1290 nm at a draw tension F of 125 g to about 1340 nm at a draw tension F of 200 g. The plots of FIGS. 8A and 8B illustrate that there are at least two draw tension regimes that can be used to adjust the cable cut-off wavelength $\lambda_C$.

Thus, in an example of forming the tuned fiber 6, the time-varying draw tension is either within a first draw-tension regime where the cable cut-off wavelength $\lambda_C$ decreases with increasing draw tension or within a second draw-tension regime where the cable cut-off wavelength $\lambda_C$ increases with increasing draw tension. In one example based on the plots of FIGS. 8A and 8B, the first draw-tension regime the time-varying draw tension is in the range from about 70 g to about 120 g and wherein in the second draw-tension region the time-varying draw tension is in the range from about 125 g to about 200 g.

Aspect 1 of the description is:
A method of manufacturing a tuned optical fiber, comprising:
  providing in a furnace a first preform from a set of preforms each having a variation in an optical or physical property as a function of axial position relative to a target value of the optical or physical property;
  drawing a reference optical fiber from the first preform using a constant draw tension;
  determining a variation in the optical or physical property of the reference optical fiber as a function of axial position relative to the target value of the optical or physical property; and
  drawing from a second preform from the set of preforms a tuned optical fiber, the drawing from the second preform including using a time-varying draw tension, the time-varying draw tension reducing the variation in the optical or physical property as a function of axial position relative to the target value of the optical or physical property in the tuned optical fiber relative to the reference optical fiber.

Aspect 2 of the description is:
The method according to Aspect 1, wherein the time-varying draw tension ranges from 30 grams to 300 grams.

Aspect 3 of the description is:
The method according to Aspect 1 or 2, wherein the drawing the second preform includes adjusting a draw temperature.

Aspect 4 of the description is:
The method according to any of Aspects 1-3, wherein the reduction in the variation in the optical or physical property of the tuned optical fiber relative to the reference optical fiber is at least 30%.

Aspect 5 of the description is:
The method according to any of Aspects 1-3, wherein the reduction in the variation in the optical or physical property of the tuned optical fiber relative to the reference optical fiber is at least 50%.

Aspect 6 of the description is:
The method according to any of Aspects 1-3, wherein the reduction in the variation in the optical or physical property of the tuned optical fiber relative to the reference optical fiber is at least 70%.

Aspect 7 of the description is:
The method according to any of Aspects 1-6, wherein the optical or physical property is a cable cut-off wavelength $\lambda_C$.

Aspect 8 of the description is:
The method according to Aspect 7, wherein the cable cut-off wavelength of the tuned optical fiber varies by no more than 10 nm from a mean value of the cable cut-off wavelength for a length of the tuned optical fiber of at least 5 kilometers.

Aspect 9 of the description is:
The method according to Aspect 7 or 8, wherein the time-varying draw tension is either within a first draw-tension regime where the cable cut-off wavelength decreases with increasing draw tension or within a second draw-tension regime where the cable cut-off wavelength increases with increasing draw tension.

Aspect 10 of the description is:
The method according to Aspect 9, wherein in the first draw-tension regime the time-varying draw tension is in the range from about 70 grams (g) to about 120 g and wherein in the second draw-tension region the time-varying draw tension is in the range from about 125 g to about 200 g.

Aspect 11 of the description is:
The method according to any of Aspects 1-10, wherein the time-varying draw tension imparts a time-varying axial stress to the tuned optical fiber sufficient to reduce the variation in the optical or physical property of the tuned optical fiber as a function of axial position through the stress-optic effect.

Aspect 12 of the description is:
The method according to any of Aspects 1-11, wherein the tuned optical fiber has a relative refractive index profile that comprises a trench and one or more optical properties required by an optical fiber industry standard ITU-G.657.A2.

Aspect 13 of the description is:
The method according to Aspect 12, wherein the trench is a region of the tuned optical fiber that comprises silica doped with fluorine.

Aspect 14 of the description is:
The method according to Aspect 12 or 13, wherein the tuned optical fiber has a length of at least 5 kilometers and greater than 85% of the length of the tuned optical fiber exhibits a cable cutoff wavelength $\lambda_C$ of less than 1260 nm.

Aspect 15 of the description is:
The method according to Aspect 12 or 13, wherein the tuned optical fiber has a length of at least 5 kilometers and greater than 95% of the tuned optical fiber exhibits a cable cutoff wavelength $\lambda_C$ of less than 1260 nm.

Aspect 16 of the description is:

A method of manufacturing a tuned optical fiber, comprising:

measuring an optical or physical property of a glass preform in an axial direction;

determining a variation in the optical or physical property of the glass preform in the axial direction relative to a target value of the optical or physical property of the glass preform in the axial direction;

specifying a fixed draw tension;

determining an expected variation in the optical or physical property in the axial direction for an optical fiber of a specified length drawn from the glass preform from the variation in the optical or physical property of the glass preform in the axial direction and the fixed draw tension;

determining a time-varying draw tension from the expected variation; and drawing a tuned optical fiber from the glass preform, the drawing comprising imparting the time-varying draw tension to the glass preform, the tuned optical fiber having a variation in the optical or physical property in the axial direction over the specified length less than the expected variation.

Aspect 17 of the description is:

The method according to Aspect 16, wherein the time-varying draw tension ranges from 30 grams to 300 grams.

Aspect 18 of the description is:

The method according to Aspect 16 or 17, wherein imparting the time-varying draw tension comprises a varying the temperature of the glass preform.

Aspect 19 of the description is:

The method according to any of Aspects 16-18, wherein the variation in the one optical or physical property in the axial direction of the tuned optical fiber is at least 30% less than the expected variation over the specified length.

Aspect 20 of the description is:

The method according to any of Aspects 16-18, wherein the variation in the optical or physical property in the axial direction of the tuned optical fiber is at least 50% less than the expected variation over the specified length.

Aspect 21 of the description is:

The method according to any of Aspects 16-18, wherein the variation in the optical or physical property in the axial direction of the tuned optical fiber is at least 70% less than the expected variation over the specified length.

Aspect 22 of the description is:

The method according to any of Aspects 16-21, wherein the optical or physical property comprises a cable cut-off wavelength.

Aspect 23 of the description is:

The method according to Aspect 22, wherein the cable cut-off wavelength of the tuned optical fiber varies by no more than 10 nm from a mean value of the cable cut-off wavelength for a length of the tuned optical fiber of at least 5 kilometers.

Aspect 24 of the description is:

The method according to Aspect 22 or 23, wherein the time-varying draw tension is either within a first draw-tension regime where the cable cut-off wavelength decreases with increasing draw tension or within a second draw-tension regime where the cable cut-off wavelength increases with increasing draw tension.

Aspect 25 of the description is:

The method according to Aspect 24, wherein in the first draw-tension regime the time-varying draw tension is in the range from about 70 grams (g) to about 120 g and wherein in the second draw-tension region the time-varying draw tension is in the range from about 125 g to about 200 g.

Aspect 26 of the description is:

The method according to any of Aspects 22-25, wherein the specified length is at least 5 kilometers and the cable cut-off wavelength $\lambda_C$ of the tuned optical fiber is less than 1260 nm over at least 85% of the specified length.

Aspect 27 of the description is:

The method according to any of Aspects 22-25, wherein the specified length is at least 5 kilometers and the cable cut-off wavelength $\lambda_C$ of the tuned optical fiber is less than 1260 nm over at least 95% of the specified length.

Aspect 28 of the description is:

The method according to any of Aspects 16-27, wherein the tuned optical fiber has a relative refractive index profile that comprises a trench and one or more of the optical properties required by an industry standard optical fiber specification ITU-G.657.A2.

Aspect 29 of the description is:

The method according to Aspect 28, wherein the trench is a region of the tuned optical fiber that comprises silica doped with fluorine.

Aspect 30 of the description is:

A method of manufacturing a tuned optical fiber having a cable cut-off wavelength $\lambda_C$ and a length, comprising:

drawing a reference optical fiber from a first preform of a set of preforms using a constant draw tension;

measuring a variation in the cable cut-off wavelength $\lambda_C$ of the reference optical fiber as a function of axial position;

drawing a tuned optical fiber from a second preform of the set preforms, the drawing from the second preform including using a time-varying draw tension, the time-varying draw tension reducing the variation in the cable cut-off wavelength $\lambda_C$ as a function of axial position in the tuned optical fiber relative to the reference optical fiber.

Aspect 31 of the description is:

The method according to Aspect 30, wherein the tuned optical fiber has a length of at least 5 kilometers and the cable cutoff wavelength $\lambda_C$ is less than 1260 nm for greater than 85% of the length of the tuned optical fiber.

Aspect 32 of the description is:

The method according to Aspect 30, wherein the tuned optical fiber has a length of at least 5 kilometers and the cable cutoff wavelength $\lambda_C$ is less than 1260 nm for greater than 95% of the length of the tuned optical fiber.

Aspect 33 of the description is:

The method according to any of Aspects 30-32, wherein the time-varying draw tension ranges from 30 grams to 300 grams.

Aspect 34 of the description is:

The method according to any of Aspects 30-33, wherein the drawing the tuned optical fiber comprises adjusting a temperature of the second preform as a function of time.

Aspect 35 of the description is:

The method according to any of Aspects 30-34, wherein the time-varying draw tension imparts a time-varying axial stress to the tuned optical fiber sufficient to reduce the variation in the cable cutoff wavelength $\lambda_C$ of the tuned optical fiber as a function of axial position through the stress-optic effect.

Aspect 36 of the description is:

The method according to any of Aspects 30-35, wherein the cable cut-off wavelength of the tuned optical fiber varies by no more than 10 nm from a mean value of the cable cut-off wavelength for a length of the tuned optical fiber of at least 5 kilometers.

Aspect 37 of the description is:

The method according to any of Aspects 30-36, wherein the time-varying draw tension is either within a first draw-tension regime where the cable cut-off wavelength decreases with increasing draw tension or within a second draw-tension regime where the cable cut-off wavelength increases with increasing draw tension.

Aspect 38 of the description is:

The method according to Aspect 37, wherein in the first draw-tension regime the time-varying draw tension is in the range from about 70 grams (g) to about 120 g and wherein in the second draw-tension region the time-varying draw tension is in the range from about 125 g to about 200 g.

Aspect 39 of the description is:

A method of manufacturing a tuned optical fiber, comprising:

providing in a furnace a first preform from a set of preforms each having a variation in a physical property as a function of axial position relative to a target value of the physical property;

drawing a reference optical fiber from the first preform using a constant draw tension;

determining a variation in the physical property of the reference optical fiber as a function of axial position relative to the target value of the physical property; and drawing from a second preform from the set of preforms a tuned optical fiber, the drawing from the second preform including using a time-varying draw tension, the time-varying draw tension reducing the variation in the physical property as a function of axial position relative to the target value of the physical property in the tuned optical fiber relative to the reference optical fiber.

Aspect 40 of the description is:

A method of manufacturing a tuned optical fiber, comprising:

measuring a physical property of a glass preform in an axial direction;

determining a variation in the physical property of the glass preform in the axial direction relative to a target value of the physical property of the glass preform in the axial direction;

specifying a fixed draw tension;

determining an expected variation in the physical property in the axial direction for an optical fiber of a specified length drawn from the glass preform from the variation in the physical property of the glass preform in the axial direction and the fixed draw tension;

determining a time-varying draw tension from the expected variation; and drawing a tuned optical fiber from the glass preform, the drawing comprising imparting the time-varying draw tension to the glass preform, the tuned optical fiber having a variation in the physical property in the axial direction over the specified length less than the expected variation.

The systems and methods disclosed results in improving the manufacturing yields of single mode bend insensitive fibers and result in lower cost for these optical fibers. It will be apparent to those skilled in the art that various modifications and variations can be made without departing from the spirit or scope of the claims.

What is claimed is:

1. A method of manufacturing a tuned optical fiber, comprising:

providing in a furnace a first preform from a set of preforms, each preform in the set of preforms having an axial variation in soot overclad thickness, the axial variation in soot overclad thickness leading to a variation in a cable cut-off wavelength $\lambda_C$ of the preform as a function of axial position relative to a target value of the cable cut-off wavelength $\lambda_C$;

drawing a reference optical fiber from the first preform using a constant draw tension;

determining a variation in the cable cut-off wavelength $\lambda_C$ of the reference optical fiber as a function of axial position relative to the target value of the cable cut-off wavelength $\lambda_C$; and drawing from a second preform from the set of preforms a tuned optical fiber, the drawing from the second preform including using a time-varying draw tension, the time-varying draw tension reducing the variation in the cable cut-off wavelength $\lambda_C$ as a function of axial position relative to the target value in the tuned optical fiber to less than the variation in the cable cut-off wavelength $\lambda_C$ as a function of axial position relative to the target value in the reference optical fiber;

wherein the cable cut-off wavelength of the tuned optical fiber varies by no more than 10 nm from a mean value of the cable cut-off wavelength for a length of the tuned optical fiber of at least 5 kilometers; and wherein the time-varying draw tension is either within a first draw-tension regime where the cable cut-off wavelength $\lambda_C$ decreases with increasing draw tension or within a second draw-tension regime where the cable cut-off wavelength $\lambda_C$ increases with increasing draw tension, the first draw-tension regime comprising a draw tension in the range from about 70 grams (g) to about 120 g and the second draw-tension region comprising a draw tension in the range from about 125 g to about 200 g.

2. The method according to claim 1, wherein the time-varying draw tension ranges from 30 grams to 300 grams.

3. The method according to claim 1, wherein the drawing the second preform includes adjusting a draw temperature.

4. The method according to claim 1, wherein the reduction in the variation in the optical or physical property of the tuned optical fiber relative to the reference optical fiber is at least 50%.

5. The method according to claim 1, wherein the time-varying draw tension imparts a time-varying axial stress to the tuned optical fiber sufficient to reduce the variation in the optical or physical property of the tuned optical fiber as a function of axial position through the stress-optic effect.

6. The method according to claim 1, wherein the tuned optical fiber has a relative refractive index profile that comprises a trench and one or more optical properties required by an optical fiber industry standard ITU-G.657.A2.

7. The method according to claim 6, wherein the tuned optical fiber has a length of at least 5 kilometers and greater than 85% of the length of the tuned optical fiber exhibits a cable cutoff wavelength $\lambda_C$ of less than 1260 nm.

* * * * *